US012772172B2

(12) United States Patent
Wong et al.

(10) Patent No.: US 12,772,172 B2
(45) Date of Patent: Oct. 20, 2026

(54) USER EQUIPMENT, WIRELESS COMMUNICATIONS NETWORK AND METHODS

(71) Applicant: Sony Group Corporation, Tokyo (JP)

(72) Inventors: Shin Horng Wong, Basingstoke (GB); Martin Warwick Beale, Basingstoke (GB); Basuki Priyanto, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 220 days.

(21) Appl. No.: 18/686,513

(22) PCT Filed: Jul. 19, 2022

(86) PCT No.: PCT/EP2022/070235
§ 371 (c)(1),
(2) Date: Feb. 26, 2024

(87) PCT Pub. No.: WO2023/030744
PCT Pub. Date: Mar. 9, 2023

(65) Prior Publication Data

US 2025/0071682 A1 Feb. 27, 2025

(30) Foreign Application Priority Data

Sep. 3, 2021 (EP) .................................... 21194941

(51) Int. Cl.
*H04W 52/02* (2009.01)

(52) U.S. Cl.
CPC ... *H04W 52/0235* (2013.01); *H04W 52/0277* (2013.01)

(58) Field of Classification Search
CPC ......... H04W 52/0235; H04W 52/0225; H04W 52/0277
See application file for complete search history.

(56) References Cited

U.S. PATENT DOCUMENTS

2015/0128733 A1 5/2015 Taylor et al.
2015/0215989 A1* 7/2015 Bangolae ............. H04B 7/0417 370/311
2023/0269821 A1* 8/2023 Ranjan .............. H04W 52/0216 370/329

OTHER PUBLICATIONS

Mediatek Inc., "Revised WID UE Power Saving Enhancements for NR", 3GPP TSG RAN meeting #88e, RP-200938, Electronic Meeting, Jun. 29-Jul. 3, 2020, 5 pages.

(Continued)

*Primary Examiner* — Sulaiman Nooristany
(74) *Attorney, Agent, or Firm* — XSENSUS LLP

(57) ABSTRACT

A user equipment includes transceiver circuitry, control circuitry for controlling the transceiver circuitry and an energy storage device configured to provide energy to at least the transceiver circuitry for transmitting signals to or receiving signals from the wireless communications network. The energy storage device may receive energy from ambient sources and may therefore increase an amount of available energy by using energy harvesting. The user equipment is configured to determine, during an idle or inactive mode in which the user equipment has no active connection for transmitting data to or receiving data from the wireless communications network that an amount of energy which is available from the energy storage device will be insufficient for operating the transceiver circuitry during a blackout period, and to transmit to the infrastructure equipment a blackout message indicating that the user equipment cannot receive signals transmitted from the infrastructure equipment for the blackout period.

19 Claims, 16 Drawing Sheets

Blackout Complete message sent in Message A to gNB2

(56) References Cited

OTHER PUBLICATIONS

Ericsson, "Revised WID on support of reduced capability NR devices", 3GPP TSG RAN Meeting #92e, RP-211574, Revision of RP-210918, Electronic Meeting, Jun. 14-18, 2021, 6 pages.
Ma et al., "Sensing, Computing, and Communications for Energy Harvesting IoTs: A Survey", arXiv:1905.03949v2, Dec. 24, 2019, pp. 1-30.
Holma et al., "LTE for UMTS OFDMA and SC-FDMA based radio access", John Wiley and Sons, 2009, 232 pages.
Catt, Caict, "New Wid: Ue Power Saving in NR", 3GPP TSG RAN Meetings #83, RP-190727, Mar. 18-21, 2019, 5 pages.
Everactive, "On RedCap Enhancement in Rel-18—Supporting Batteryless Devices", 3GPP TSG RAN Rel-18 workshop, RWS-210085, Electronic Meeting, Jun. 28-Jul. 2, 2021, 9 pages.
Vivo, "Motivation for new study item on ultra low power wake up signal in Rel 18", 3GPP TSG RAN Rel-18 workshop, RWS-210168, Electronic Meeting, Jun. 28 Jul. 2, 2021, 14 pages.
Sony, "IoT Features in Rel-18", 3GPP TSG RAN Rel-18 workshop, RWS-210302, Electronic Meeting, Jun. 28-Jul. 2, 2021, 4 pages.
Ericsson, "Motivation for Rel-18 WI on Enhanced RedCap", 3GPP TSG RAN Rel-18 workshop, RWS-210313, Electronic Meeting Jun. 28-Jul. 2, 2021, 13 pages.
International Search Report and Written Opinion mailed on Nov. 21, 2022, received for International Patent Application No. PCT/EP2022/070235, filed on Jul. 19, 2022, 08 pages.

* cited by examiner

Network escalates paging after failing to get a response from a paged EH-UE

Blackout indication from UE to network

Blackout message indicating the start and duration of the blackout period

Blackout message indicates when blackout period is completed

Blackout Complete message transmitted to a different cell

Partial blackout with delayed respond

Blackout response message sent in paging response

UE sends full paging response message after blackout period

Network response message to UE's blackout indicator

Blackout message transmitted as part of response to a paging

Blackout Complete message sent in Message A to gNB2

USER EQUIPMENT, WIRELESS COMMUNICATIONS NETWORK AND METHODS

CROSS-REFERENCE TO RELATED APPLICATIONS

This application is a national stage application, pursuant to 35 U.S.C. § 371, of International Patent Application No. PCT/EP2022/070235, filed Jul. 19, 2022, which claims priority from European Patent Application No. 21194941.7, filed Sep. 3, 2021, the entire contents of each are incorporated herein by reference.

BACKGROUND

Field of the Disclosure

The present disclosure relates to user equipment for communications devices, wireless communications networks and methods of operating communications devices or wireless communications networks. Embodiments relate to communications devices which operate with an energy storage device which provides power to operate a transceiver circuit.

Description of the Related Art

The "background" description provided is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Recent generation mobile telecommunication systems, such as those based on the 3$^{rd}$ Generation Partnership Project (3GPP®) defined Universal Mobile Telecommunications System (UMTS), Long Term Evolution (LTE) and 5G New Radio (NR) architectures, are able to support a wider range of services than simple voice and messaging services offered by previous generations of mobile telecommunication systems. For example, with the improved radio interface and enhanced data rates provided by LTE and NR systems, a user can experience high data rate applications such as mobile video streaming and mobile video conferencing that would previously only have been available via a fixed line data connection. In addition to supporting these kinds of more sophisticated services and devices, it is also proposed for newer generation mobile telecommunication systems such as NR to support less complex services and devices which make use of the reliable and wide ranging coverage of newer generation mobile telecommunication systems without necessarily needing to rely on the high data rates available in such systems. For example, a less complex device may be a tiny device equipped with sensors and a small battery capacity. Such a less complex device needs to transmit the sensor data at a typically infrequent and/or low data rate.

The demand to deploy such networks is therefore strong and the coverage area of these networks, i.e. geographic locations where access to the networks is possible, may be expected to increase ever more rapidly. There is also a continuing need to improve the network speed, reliability, efficiency and/or flexibility of these networks. In particular, there is a need to ensure entities of a network are provided with sufficient energy to communicate with the network, are able to use that energy efficiently, and are able to use radio resources efficiently.

In some scenarios communications devices may be required to operate with and react to an amount of power, which is available from an energy storage device, to operate the communications device.

SUMMARY

The present disclosure is defined by the appended claims. According to example embodiments there is provided a user equipment forming a wireless communications device operating with a wireless communications network. The user equipment includes transceiver circuitry, control circuitry for controlling the transceiver circuitry and an energy storage device configured to provide energy to at least the transceiver circuitry, for operation of the transceiver circuitry for transmitting the signals to or receiving the signals from the wireless communications network. The energy storage device may receive energy from ambient sources and may therefore increase an amount of available energy by using energy harvesting. The user equipment is configured to determine, during an idle or inactive mode in which the user equipment has no active connection for transmitting data to or receiving data from the wireless communications network that an amount of energy which is available from the energy storage device will be insufficient for operating the transceiver circuitry during a blackout period, and to transmit to the infrastructure equipment a blackout message indicating that the user equipment cannot receive signals transmitted from the infrastructure equipment for the blackout period. Here, the infrastructure equipment could be a radio network infrastructure equipment such as a gNB or base station or it could be part of the core network, which receives the blackout message and for example would control transmission of a paging message to the UE using the cells of the radio network. By transmitting a blackout message to the wireless communications network, the user equipment informs the wireless communications network that the UE will not respond to a paging message, for example, and so will not cause the network to escalate transmission of the paging of the message to other infrastructure equipment or to a different tracking area of the wireless communications network.

Various further aspects and features of the disclosure are defined in the appended claims and include a wireless communications network, a method of operating a user equipment forming a wireless communications device and a method of operating a wireless communications network.

BRIEF DESCRIPTION OF THE DRAWINGS

Non-limiting embodiments and advantages of the present disclosure are explained with reference to the following detailed description taken in conjunction with the accompanying drawings, wherein.

Like reference numerals designate identical or corresponding parts throughout the drawings.

DETAILED DESCRIPTION OF THE EMBODIMENTS

Long Term Evolution (LTE) Wireless Communications System

Figure 1:
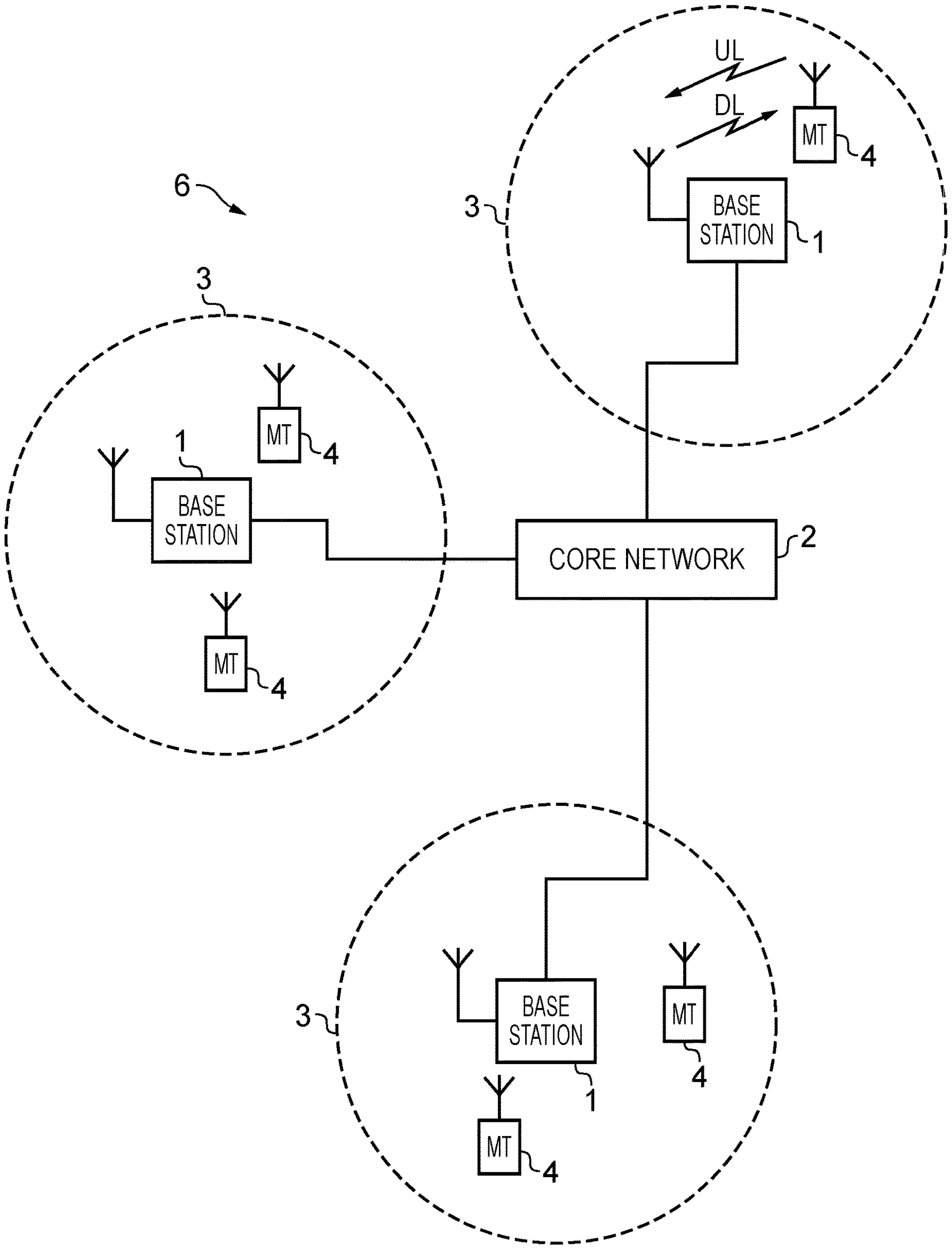
FIG. 1 schematically represents some elements of an LTE-type wireless telecommunications system.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. A communications device may also be referred to as a mobile station, user equipment (UE), user terminal, mobile radio, terminal device and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

A base station which is an example of network infrastructure equipment, may also be referred to as a transceiver station, nodeB, e-nodeB, eNB, g-nodeB, gNB and so forth (note g-nodeB and gNB are related to 5G New Radio—see below). In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

In the present disclosure, any apparatus (e.g. communications device, infrastructure equipment and the like) which transmits and/or receives wireless telecommunications signals in any of the exemplified wireless telecommunication networks/systems may be referred to generally as a wireless telecommunications apparatus.

5G New Radio (NR) Wireless Communications System

Figure 2:
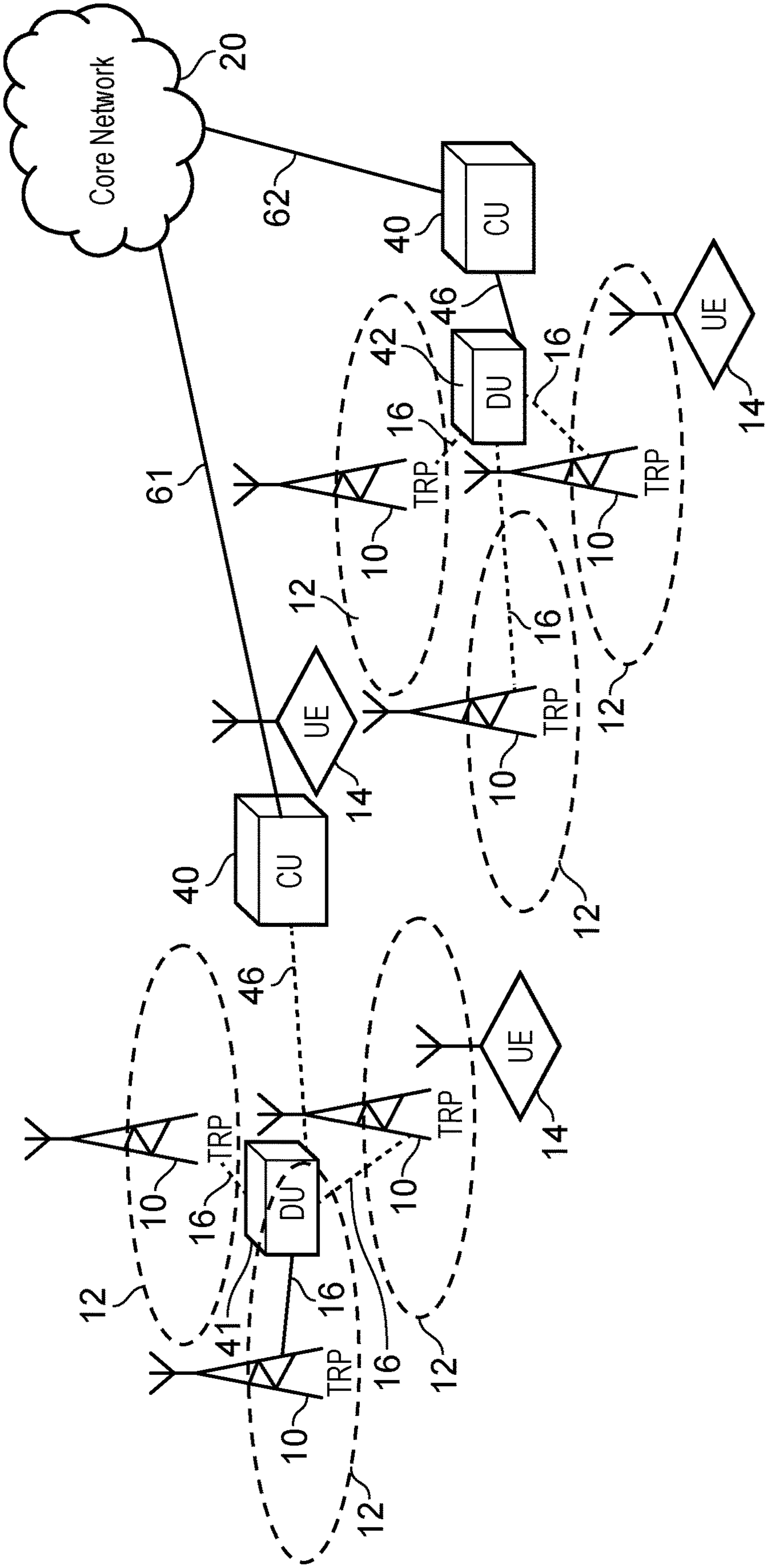
FIG. 2 schematically represents some elements of an NR-type wireless telecommunications system.

An example configuration of a wireless communications network which uses some of the terminology proposed for NR is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to a core network 20 by an interface 61, 62, which may contain all other functions required for communicating data to and from the wireless communications devices and the core network 20. The core network 20 may be connected to other networks.

The elements of the wireless access network shown in FIG. 2 may operate in a similar way to corresponding elements of an LTE network as described with regard to the example of FIG. 1. It will be appreciated that operational aspects of the telecommunications network represented in FIG. 2 and of other networks discussed herein in accordance with embodiments of the disclosure which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated, therefore, that operational aspects of an NR network (for example in relation to specific communication protocols and physical channels for communicating between different elements) may be different to those known from LTE or other known mobile telecommunications standards. However, it will also be appreciated that each of the core network component, base stations and communications devices of an NR network will be functionally similar to, respectively, the core network component, base stations and communications devices of an LTE wireless communications network.

In terms of broad top-level functionality, the core network 20 connected to the NR telecommunications system represented in FIG. 2 may be broadly considered to correspond with the core network 2 represented in FIG. 1, and the central unit 40 and associated DUs 41, 42/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the CU 40, DUs 41, 42 and/or TRPs 10. Communications devices 14 are represented in FIG. 2 within the coverage area of respective communication cells 12. These communications devices 14 may thus exchange signalling with the CU 40 via the TRP 10 associated with their respective communications cells 12.

It will further be appreciated that FIG. 2 represents merely one example of a proposed architecture for an NR-based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a CU 40, DU 41, 42 and/or TRP 10 of the kind shown in FIG. 2 which is adapted to provide functionality in accordance with the principles described.

Figure 3:
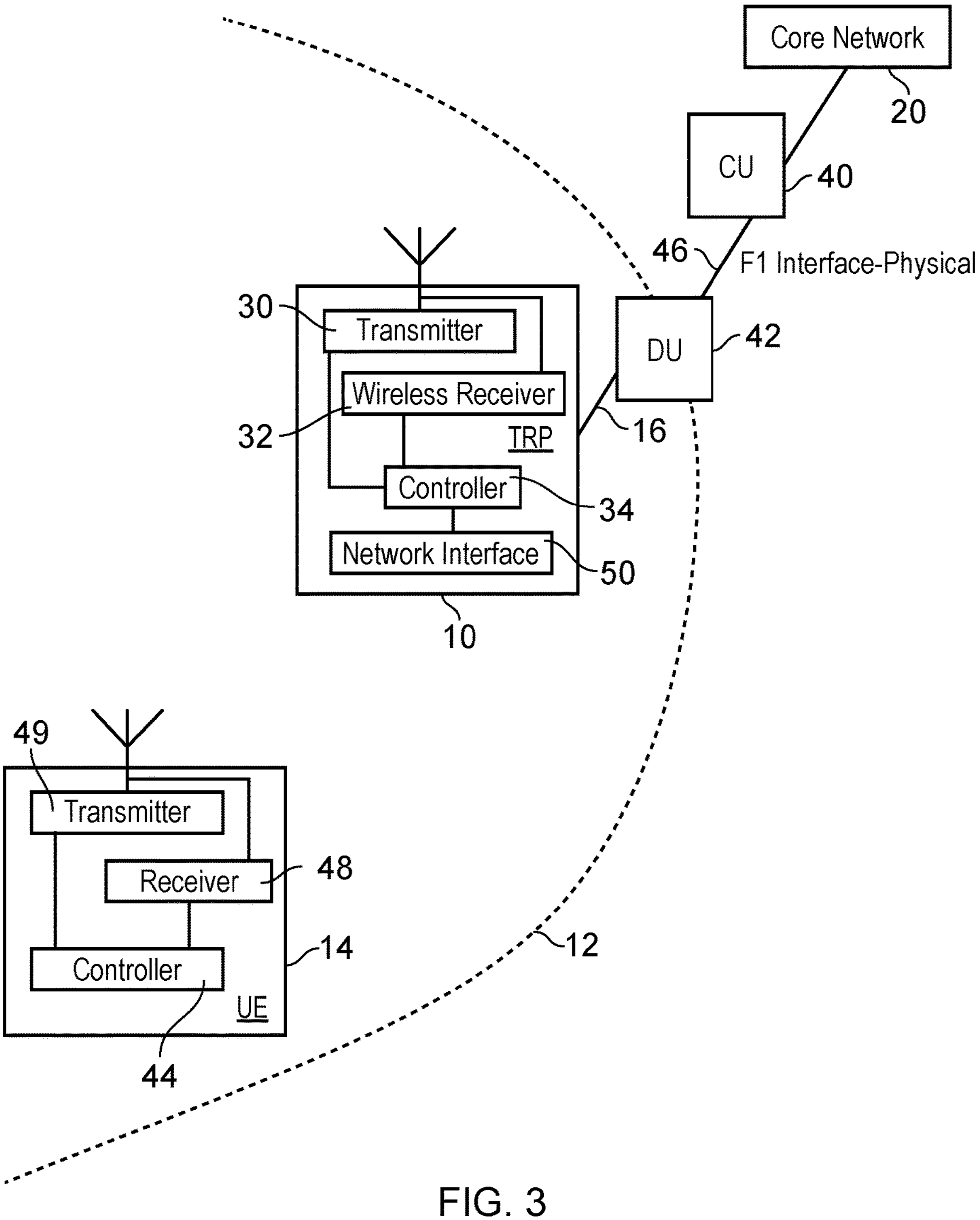
FIG. 3 schematically represents some components of the wireless telecommunications system shown in FIG. 2 in more detail.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which is configured to control the transmitter 30 and the receiver 32 to transmit radio signals to and receive radio signals from one or more UEs 14 within a cell 12 formed by the TRP 10. As shown in FIG. 3, an example UE 14 is shown to include a corresponding wireless transmitter 49, wireless receiver 48 and a controller or controlling processor 44 which is configured to control the transmitter 49 to transmit signals representing uplink data to the wireless communications network via the wireless access interface formed by the TRP 10 and the receiver 48 to receive downlink data as signals transmitted by the transmitter 30 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance, for example, with the 5G/NR standard. The controllers 34, 44 (as well as other controllers described in relation to examples and embodiments of the present disclosure) may be, for example, a microprocessor, a CPU, or a dedicated chipset, etc., configured to carry out instructions, which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473 and, for example, may be formed from a fibre optic or other wired high bandwidth connection. In one example, the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Those acquainted with wireless communications networks which operate according to 5G/NR will be familiar with the term gNB which is formed from a combination of a TRP and a DU.

Mobility for Reduced Capability Devices

Figure 4:
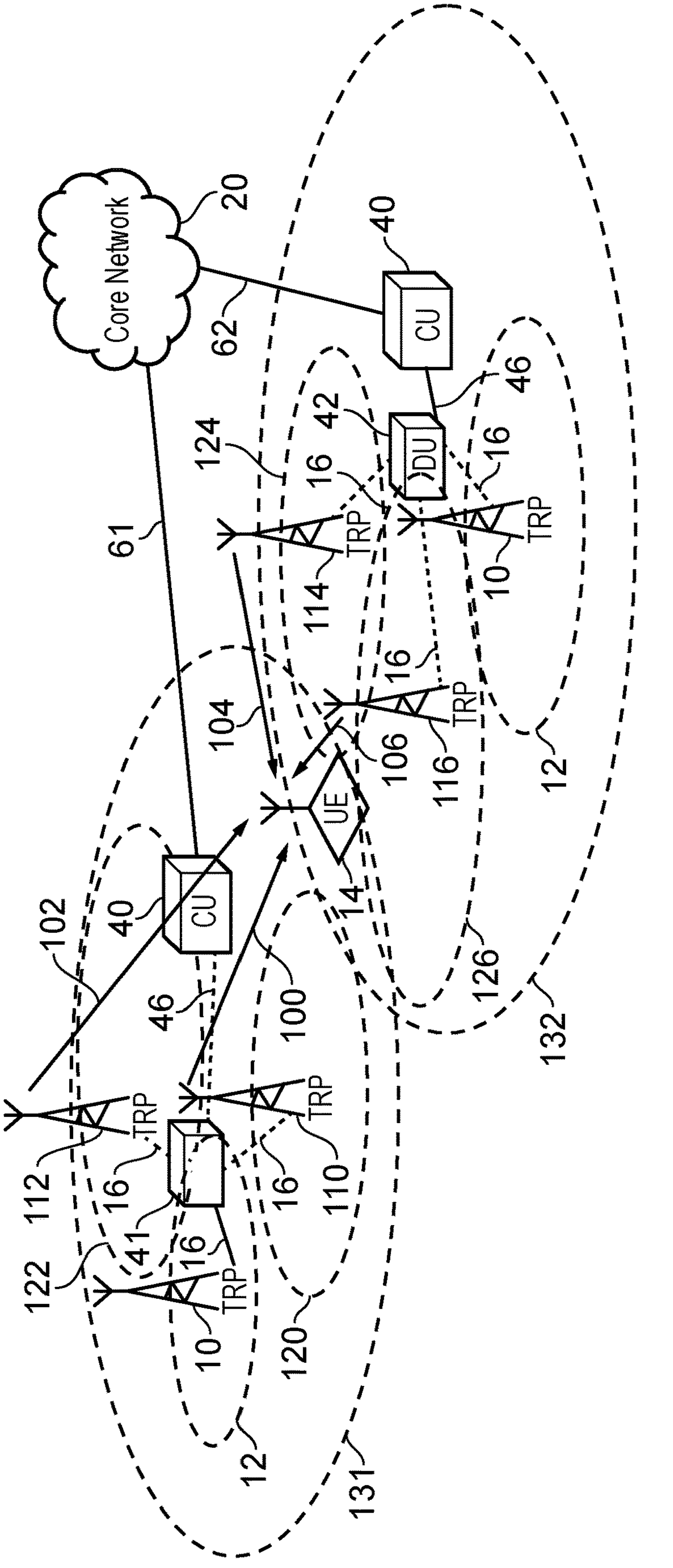
FIG. 4 schematically represents some elements of an NR-type wireless telecommunications system operating in accordance with example embodiments in which a communications device performs an Idle mode Cell Reselection procedure.

As will be explained in the following paragraphs, embodiments of the present technique can provide improvements to reduced capability (Redcap) mobile communications devices/UEs when these devices are mobile and roam through a wireless communications network. In order to appreciate the example embodiments described below, aspects relating to a UE's mobility will be explained with reference to FIG. 4, which is reproduced from FIG. 2 and so only the differences will be described. FIG. 4 reproduces FIG. 2 but shows a communications device/UE detecting signals as part of an Idle mode Cell Reselection procedure represented by arrows 100, 102, 104, 106, from the TRPs 110, 112, 114, 116 which form cells 120, 122, 124, 126 respectively. As shown in FIG. 4, the TRPs 10, 110, 112, 114, 116 may be grouped into groups of cells 131, 132 controlled by different CUs. In one example each of the two groups of cells 131, 132 may form two tracking areas.

As will be appreciated by skilled persons, a UE 14 can operate in a connected mode in which a connection has been established via the wireless communications network for transmitting data to or receiving data from one of the TRPs/gNBs, or in an idle mode in which no connection has been established. In an idle mode, a mobile UE roaming through a wireless communications network performs a Cell Reselection Procedure in which the UEs measure a received signal strength of a System Information Block (SIB) or Synchronisation Signal Block (SSB) transmitted by each TRP 110, 112, 114, 116 represented by the arrows 100, 102, 104, 106 and selects a cell formed by the TRP based on a received signal strength of the SIB or SSB. The UE 14 in idle mode performs Cell Reselection by selecting the most suitable gNB/TRP, i.e. strongest RSRP, to attach to without the need of any signaling between the gNB and UE. The UE needs only to be able to read the SIBs/SSBs from a target gNB. As a consequence of this, the network is not aware which gNB the UE is attached to, i.e. the network does not know the location of an Idle Mode UE at the gNB level. The UE however, needs to inform the network if it moves out of a Tracking Area by sending a Tracking Area Update (TAU) when moving between a first tracking area 131 and a second tracking area 132.

When a network needs to page a UE in idle mode, it typically starts by attempting to page the UE in the last gNB that the UE was connected to. The network may perform a few attempts to page the UE at that gNB before it escalates to a larger area, i.e. involving more gNBs to page the UE, and this process may continue until the network reaches the Tracking Area.

UEs Powered by Energy Harvesting

Low complexity UEs such as eMTC and NB-IoT UEs have been specified in LTE for IoT, where the UE is expected to have low data rate, infrequent traffic, be latency tolerant, low power and can operate in enhanced coverage.

There are other IoT traffic types with different requirements to those in eMTC and NB-IoT that have moderate data rate (up to 150 Mbps DL and 50 Mbps UL) but still require low complexity for certain applications, such as wearables and video surveillance. Recognising this, 3GPP has started a Rel-17 Work Item for 5G NR [3], to specify requirements for a Reduced Capability (RedCap) UE that has reduced UE bandwidth, receiver branches, lower number of DL MIMO layers, relaxed modulation and supports HD-FDD (half duplex FDD).

As networks develop, there is a need to ensure entities of a network are provided with sufficient energy to communicate with the network and are able to use that energy efficiently. This is particularly true for UEs.

RF Incident Energy

There are various proposals to enhance UE power saving. One of these enhancements is a "zero" power UE, where the UE can harvest energy to power its communication with the gNB. For example, the energy can be harvested from ambient harvestable energy sources such as solar, wind, vibration, piezoelectric, wave action, tidal action, etc. or even from incident radio frequency (RF) energy.

An advantage is the RF energy is always available. Hence the UE can always be awake while being powered from this energy.

A disadvantage is the received power of the RF energy source is typically low. A receiver operating on such energy typically requires a power level of −20 dBm for operation, which is not consistent with the low amounts of received power that are typically available.

Another disadvantage is the transmission power level of a device that is powered by an RF energy source is typically very low. Such devices may operate based on backscattering technology, for example. The backscattered signal is created at the same carrier frequency as the incident RF energy. It is thus hard for the source of the RF energy (e.g. a gNB) to differentiate between the transmitted RF signal and the backscattered signal.

Another disadvantage is that, to reduce the power consumption of a receiver that operates on incident RF energy, a new waveform/signaling scheme is typically required. For example, an on-off keying (OOK) signaling scheme may be used for such lower power communications. There are then issues of multiplexing this new signaling scheme with the currently supported orthogonal frequency-division multiplexing (OFDM) and SC-FDMA waveforms.

Ambient Energy

Since there are multiple disadvantages to operating on incident RF energy, it can be desirable to operate based on ambient harvested energy. There are multiple forms of ambient harvestable energy, including solar, wind, vibration, piezoelectric, wave action, tidal action, etc.

A problem with operating on some forms of ambient energy is its unpredictability. Both the available power of ambient energy and whether the ambient energy source exists or not are unpredictable. For example, the available power of wind energy depends on the wind speed. On windless days, wind energy is not available.

Some aspects of ambient energy are predictable. For example, it is known that solar energy is available between sunrise and sunset and that the amount of solar energy depends on the elevation angle of the sun relative to the solar power harvesting device. The amount of harvestable energy may still vary however (for example, depending on cloud cover). It is also known that there are times at which this energy source is unavailable, for example during hours of darkness.

Devices can store harvested energy using, for example, batteries, capacitors or supercapacitors. Energy storage technologies can be characterized by, amongst other things, the amount of charge and/or energy which is storable, the rate at which charge can be stored on the device and/or the rate at which charge can be extracted from the device.

Devices operating on ambient energy can store that energy and can then use that energy to drive a modem operating with a standard waveform (such as an LTE or NR waveform). However, compared to a device operating on a conventional power source (for example, a conventional battery charged using mains electricity), the energy stored in the storage device will be rapidly depleted. The energy storage device here can be, for example, a small battery, capacitor(s) or supercapacitor(s) in which the capacity is relatively smaller than the capacity of a conventional battery. A device operating on ambient harvested energy may hence be unable to sustain a wireless connection to a network for a substantial period of time and the time for which it can sustain a connection may vary depending on conditions and the energy harvesting source. In particular, during the energy harvesting period, the device may not be able to maintain communication with the network (e.g. via a gNB). Frequent transitions between connected and disconnected operation require frequent unnecessary/repeated signalling over the network, thus increasing signalling overhead. There is a need to address this problem.

An energy storage device of the present disclosure may thus be described as a low capacity energy storage device because the amount of energy it is able to store (e.g. from ambient harvested energy) is lower than that of a conventional energy storage device charged by physically connecting the conventional energy storage device to an electricity supply (such as a mains or vehicle electricity supply).

Figure 5:
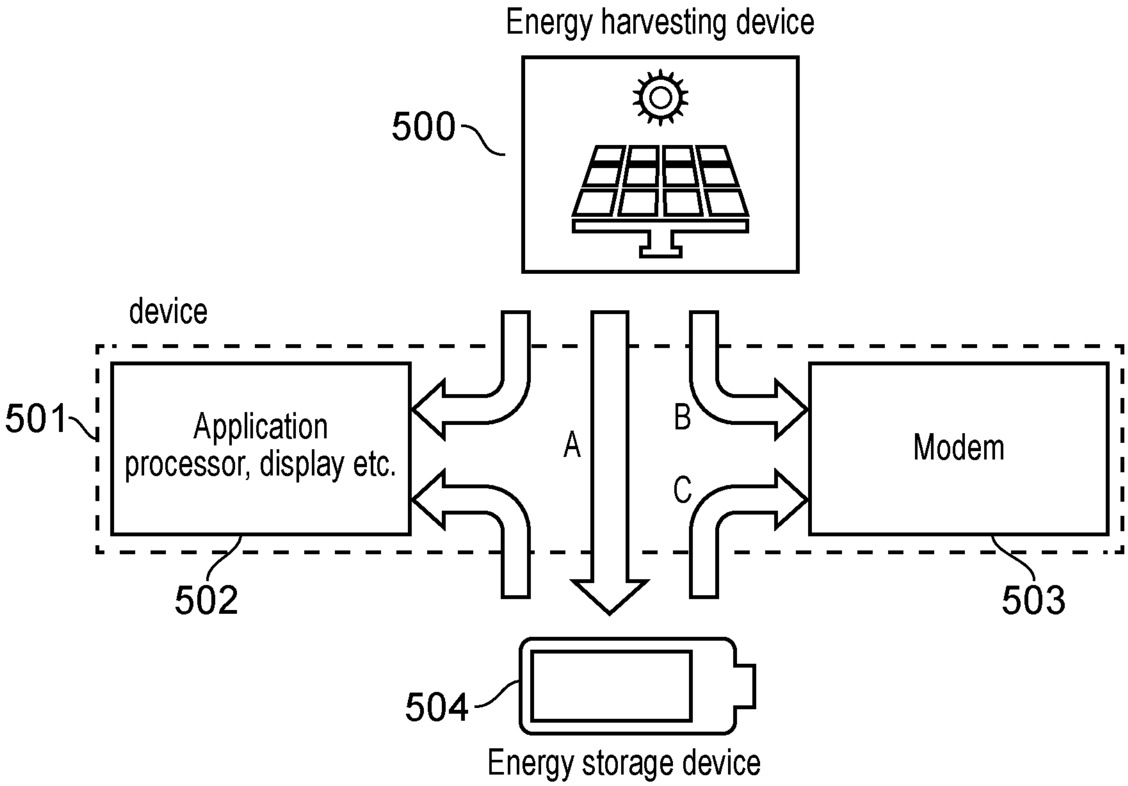
FIG. 5 schematically represents energy flows on a device using harvested energy.

FIG. 5 shows the energy flows on a device 501 operating according to harvested energy. The device consists of a modem 503, which supports communication with a base station and other parts 502 of the device 501, which include an application processor, display, etc. An energy harvesting device 500 is connected to the device. This energy harvesting device converts ambient energy (such as solar radiation) into electrical energy. The device is also connected to an energy storage device 504, such as a small battery or large capacitor. While the energy harvesting device 500 and energy storage device 504 are shown as being separate entities to the rest of the device, in some implementations, these devices and/or any other components shown in FIG. 5 may be integrated into a single device. The device 501 may be an example of the UE 14, for example. In this case, the transmitter 49 and receiver 48 are comprised within the modem 503 and the controller 44 is comprised within the modem 503 or other parts 502, for example.

The energy harvesting device 500 generates electrical energy. This energy can be stored on the energy storage device 504 via direct transfer of energy along route "A". The energy harvesting device can also directly power the modem 503 via route "B". If there is a large amount of ambient power, the energy harvesting device can simultaneously power the modem (via route "B") and store excess energy in the energy storage device (via route "A"). If there is insufficient power (for example when the modem uses a lot of power or when the energy harvesting device is generating little electrical power due to there being little ambient power), the energy storage device provides power to the modem (via route "C"). This power to the modem can be supplemented by power flowing directly from the energy harvesting device to the modem. The power flows shown in FIG. 5 can be controlled via a power management device (included in the other parts 502-in one example, when the device 501 is an example of the UE 14, the power management device may be part of the controller 44). FIG. 5 also shows that the energy harvesting device 500 and/or energy storage device 504 may also provide power to the other parts 502.

Some example values for the amount of power that can be harvested by various energy harvesting techniques are given in Table 1. This table is taken from [2]. For a solar panel with an area of 1 $cm^2$, an electrical power of approximately 10 mW could harvested, based on this table.

TABLE 1

TABLE III: Typical energy harvesting sources and techniques used in EH-IoTs.

| Source | Transduction | Signal | Principle | Requirement | Energy Density |
|---|---|---|---|---|---|
| Kinetic | Piezoelectric | AC | Apply compression on crystalline materials | Motions or vibrations | Walking: 49 $\mu W/cm^2$@3 km/h, piezoelectric EH, knee bending [25] |
| | Electromagnetic | AC | Change of magnetic field under movement | | Wind: 370 $\mu W/cm^2$@15 m/s, triboelectric EH [26] |
| | Electrostatic | AC | Change of electrical field under movement | | |
| | Triboelectric | AC | Frictional contact of two different materials | | |
| Thermal | Thermoelectric | DC | Spatial temperature gradient | Temperature difference | 14 $uW/cm^2$ on human wrist, thermoelectric EH [27] |
| | Pyroelectric | AC | Temporal temperature difference | | |
| Solar | Photovoltaic | DC | Convert light into electricity | Bright environment | Transparent: 7 $mW/cm^2$@128klux [28]<br>Opaque: 26.7 $mW/cm^2$@128klux [29]<br>Opaque: 16 $\mu W/cm^2$@400lux [30] |
| RF | RF radiation | AC | Convert electromagnetic wave into electricity | Radio coverage | TV tower: 60 μW@distance 4.1 km [31]<br>Wi-Fi: 100 μW@distance 2 feet [32] |

As an example of a device 501, a New Radio (NR) UE with reduced capability, known as NR RedCap UE, is currently being introduced in 3GPP Rel-17. A UE that can perform energy harvesting is considered as a new feature as part of the enhanced NR RedCap in the upcoming 3GPP Rel-18. The UE can be equipped with an energy storage device 504 such as a small battery and, additionally, the UE can perform self-charging by harvesting the energy to power its communication with the gNB. In another example, an NR Internet of Things (IoT) UE with such an energy harvesting feature could enable some new use-cases, for example in the area of industrial/factory automation. In such scenarios, the device is expected to operate with frequent transmission of small amounts of data (e.g. sensor data) and operate with a small battery. Hence, the energy harvesting time period can be relatively small.

In another example, some more advanced UE applications require a significant amount of data communication (such as the transmission of images or video) and the energy required to transmit the data during the length of a connection may be greater than the energy stored in the device. Therefore there is a possibility of a break in a UEs ability to transmit or receive signals, which is required for harvesting energy. The Applicant's co-pending European patent application number 21192679.5 discloses techniques for mitigating breaks during a transmission or reception of data whilst the UE is an RRC connected mode. However, as will be explained in the following paragraphs, a UE may be required to perform Energy Harvesting at any time which may affect its ability to transmit or to receive signals in an RRC idle mode as well as RRC connected mode. The contents of European patent application number 21192679.5 are incorporated herein by reference in their entirety.

Figure 6:
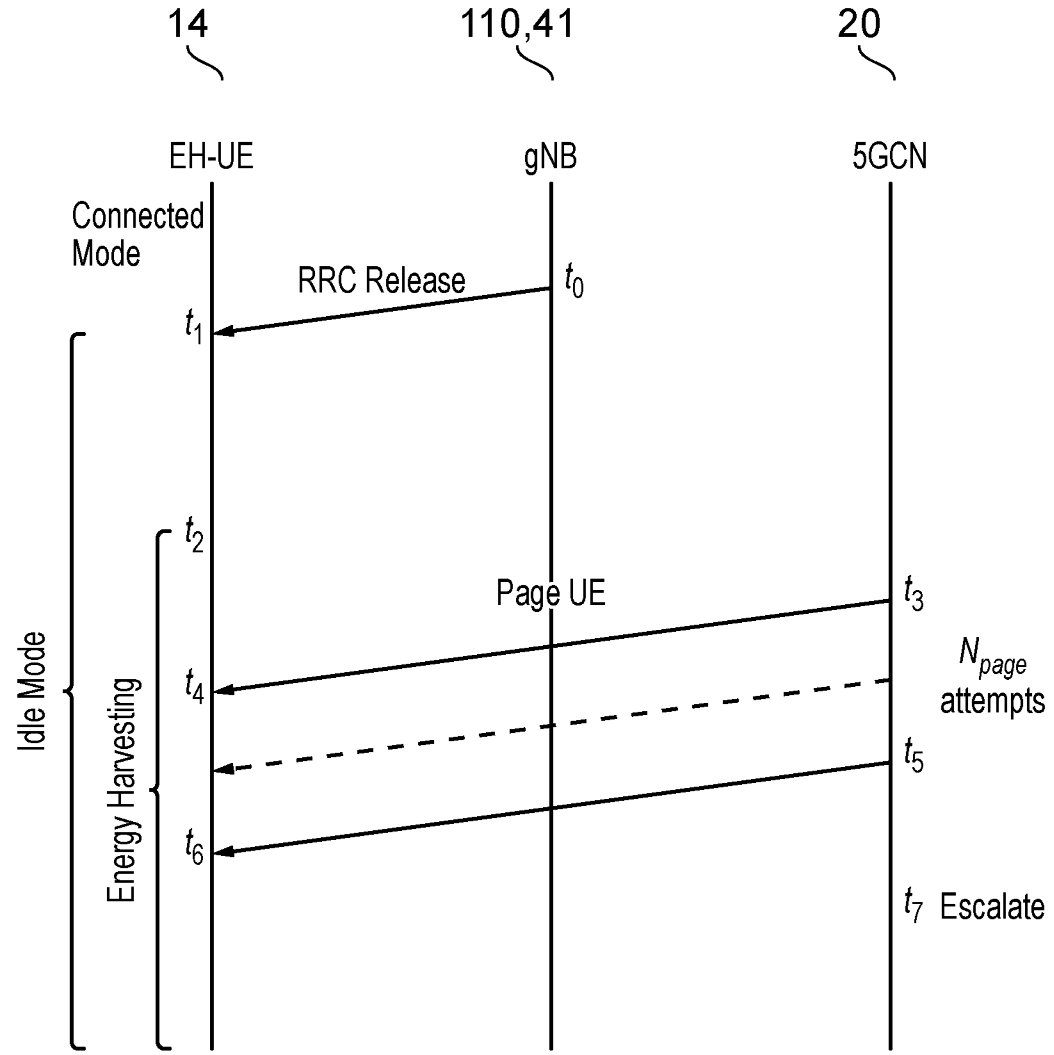
FIG. 6 represents a message flow diagram illustrating a method of operating a wireless communication system illustrating a disadvantage, which may occur when a user equipment does not respond to paging as a result of energy harvesting.

An Energy Harvesting UE (EH-UE) using an intermittent power source may experience blackouts when its internal battery level is too low and the power source is not strong enough, thereby requiring the UE to charge or when the power source is not available, e.g. dark clouds covering the sun for a solar powered UE. The network may page an EH-UE whilst the UE is in a blackout, which may lead the network to falsely assume that the UE is in the coverage area of another gNB and escalate the paging to involve more gNBs. An example is shown in FIG. 6, where the gNB sends an RRC Release message to the UE at time $t_0$, which disconnects the UE and puts it in Idle Mode. The UE moves into Idle Mode at time $t_1$. At time $t_2$, the UE runs out of energy or has very low charge in its internal battery and hence needs to blackout to perform Energy Harvesting. The network pages the UE at time $t_3$ and fails to get any response. It makes another $N_{page}$ attempts to page the UE with the last attempt at time $t_5$ and still fails to get a response. The network then wrongly assumes that the UE is not attached to the gNB and at time $t_7$, it starts escalating the paging to a larger area involving more gNBs.

Escalating a page over a large area involving multiple gNBs would lead to unnecessary transmissions to page a UE, which is undesirable since that would affect other UEs' power consumption as these other UEs may have to decode a paging message in a PDSCH even though they are not being paged. Paging over multiple gNBs would also waste paging resources and would cause interference since paging is typically transmitted to reach the cell edge of each gNB.

It is therefore desirable to avoid a network escalating a paging of a communications device/UE experiencing a blackout.

Blackout Message

Embodiments of the present invention can provide a UE forming a wireless communications device operating with a wireless communications network. The UE comprises transceiver circuitry configured to transmit signals via a wireless access of the wireless communications network and to receive signals transmitted via the wireless access interface, control circuitry configured to control the transceiver circuity to transmit the signals to or receive the signals from the wireless communications network, and an energy storage device configured to provide energy to at least the transceiver circuitry for transmitting the signals to or receiving the signals via the wireless communications network. The control circuitry is configured to determine, that an amount of energy which is available from the energy storage device will be insufficient for operating the transceiver circuitry to receive signals transmitted from an infrastructure equipment of the wireless communications network in an inactive mode (e.g. RRC Idle Mode) during a blackout period, and to transmit to the infrastructure equipment a blackout message indicating that the user equipment cannot receive signals transmitted from the infrastructure equipment for a blackout period.

In one example, the UE may have entered an RRC Idle mode or inactive mode, in which it has no RRC connection with the wireless communications network. When the UE is in an RRC idle mode, and consistent with scenarios in which the UE is mobile, the UE can perform a cell reselection procedure to select a cell formed by an infrastructure equipment of a radio network part of the wireless communications network. As part of the cell reselection procedure the UE detects signals received from a plurality of infrastructure equipment of the wireless communications network and selects a cell formed by one of the plurality of infrastructure equipment based on the detected signals. The blackout message is therefore transmitted to this selected cell and/or to the core network. In another example, a UE may have finished transmitting or receiving data in an RRC connected mode and so transitions to an RRC idle mode in which no connection with the network is established. As such, when the UE detects that it is about to enter a blackout state, the UE transmits a blackout message to the infrastructure equipment of the cell in which it had transmitted or received data in the RRC connected mode before transitioning to the RRC idle mode (e.g, as part of RRC release procedure).

Figure 7:
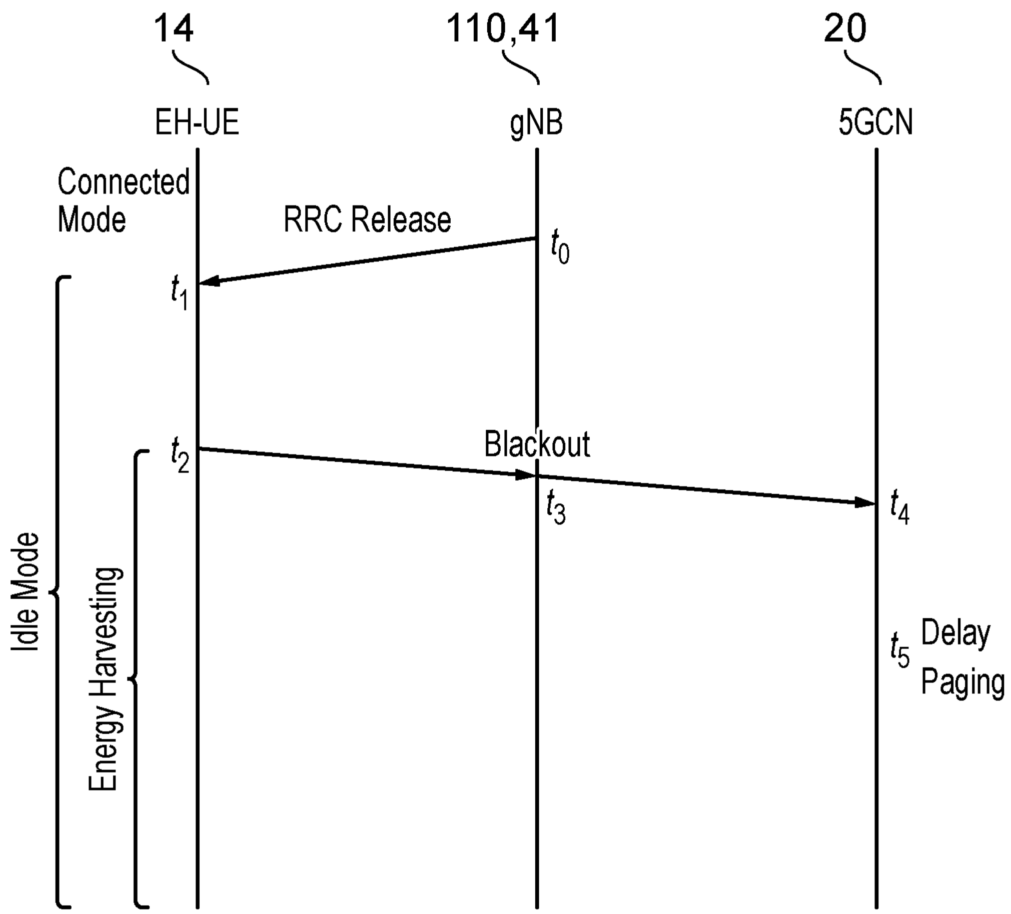
FIG. 7 represents a message flow diagram illustrating an operation of a wireless communication system according to example embodiments.

Example embodiments can provide a UE which is configured generally to inform its blackout status to the network. In one example, the UE is an EH-UE, although it will be appreciated that embodiments extend to non-EH UEs. By informing the network, the network can avoid the network from escalating a paging message for the EH-UE to multiple gNBs, trying to search for this EH-UE, since the network is aware of the status and location of the UE. An example is shown in FIG. 7, where the gNB disconnects the UE at time $t_0$ and the UE transits from Connected Mode to Idle Mode. At time $t_2$, the UE determines that it needs to perform Energy Harvesting and according to an example embodiment, the UE indicates to the network that it is going to blackout. At time ts, a message arrives for the UE but since the network is aware of the UE's condition and location, it delays paging the UE. It can be observed that compared to the prior art operation in the example in FIG. 6, the network using this invention avoided escalating the paging message to multiple gNBs.

The following are embodiments describing the information in the blackout message transmitted from the UE to the network.

In one embodiment, the blackout message indicates the start of the blackout, e.g. an offset in number of slots from the slot the blackout message is transmitted or at an absolute radio frame.

In another embodiment, the start of the blackout can be configured by the gNB, indicated by the UE as part of its capability signalling or fixed in the specifications.

In another embodiment, the blackout message indicates the duration of the blackout. This can be in units of slots, radio frames or seconds. This allows the network to decide how long to delay a paging message or whether it is worth sending the paging message if the blackout period is too long.

Figure 8:
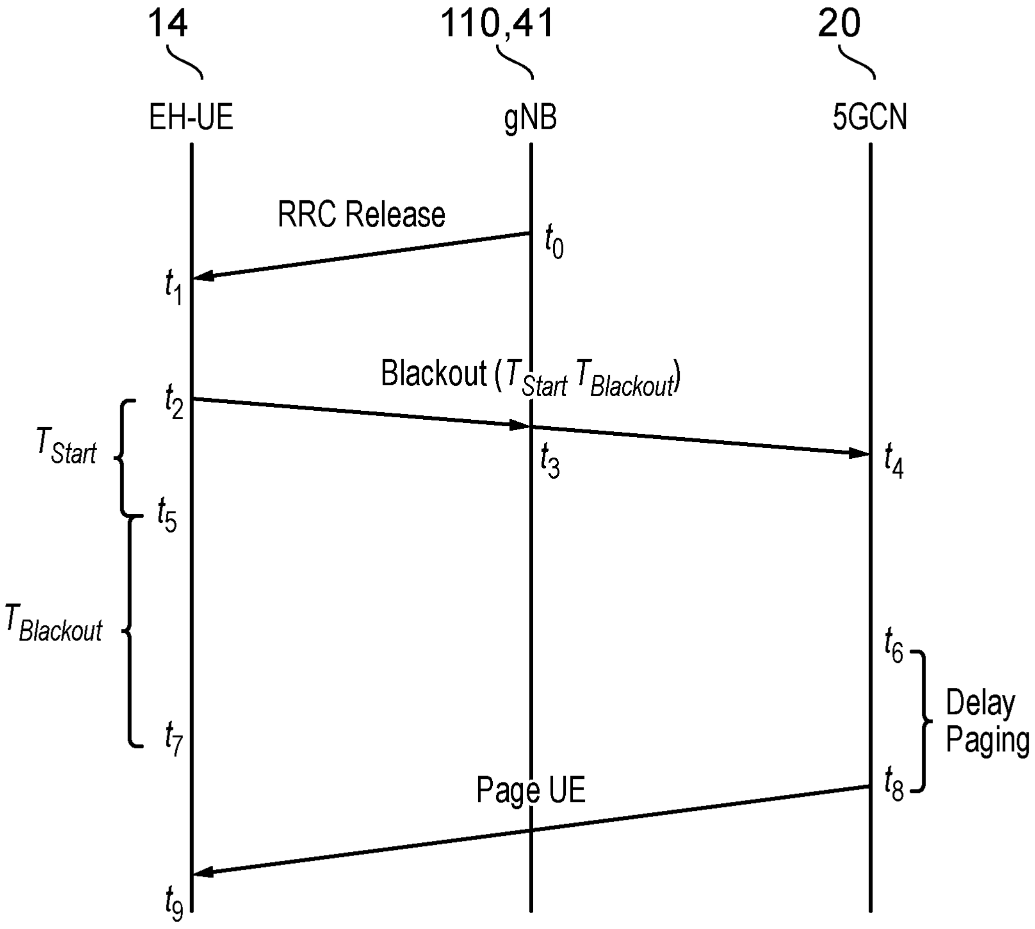
FIG. 8 represents a message flow diagram illustrating an operation of a wireless communication system according to example embodiments in which a blackout message includes a start and a duration of a blackout period.

An example, where the blackout message indicates the start and duration of the blackout period is shown in FIG. 8, where the UE transits to Idle Mode in time $t_1$ and at $t_2$ the UE informs the network that it will go into blackout at $T_{Start}$ after time $t_2$ for a duration of $T_{Blackout}$, i.e. the blackout period is between time $t_5$ to $t_7$. The network receives a message for the UE at time $t_6$ and since it is aware that the UE is still in the blackout state, it delays the paging until time $t_8$. According to some embodiments an amount of the delay applied by the network when it delays paging is up to a network implementation. In this example, the network did not transmit the message at time $t_7$, which is the time the UE moves out of the blackout but it is transmitted later at time $t_8$, to ensure the UE is fully out of the blackout and attached to the gNB.

In FIG. 8 and other Figures of the present disclosure, a blackout message is sent from the gNB to the core network. For an example of an LTE network, the blackout message is sent to a Mobility Management Entity (MME). For an NR network the blackout message may be sent to an Access and Mobility Management Entity (AMF). By sending the blackout message to the core network, the core network does not escalate the paging to other gNBs.

Figure 9:
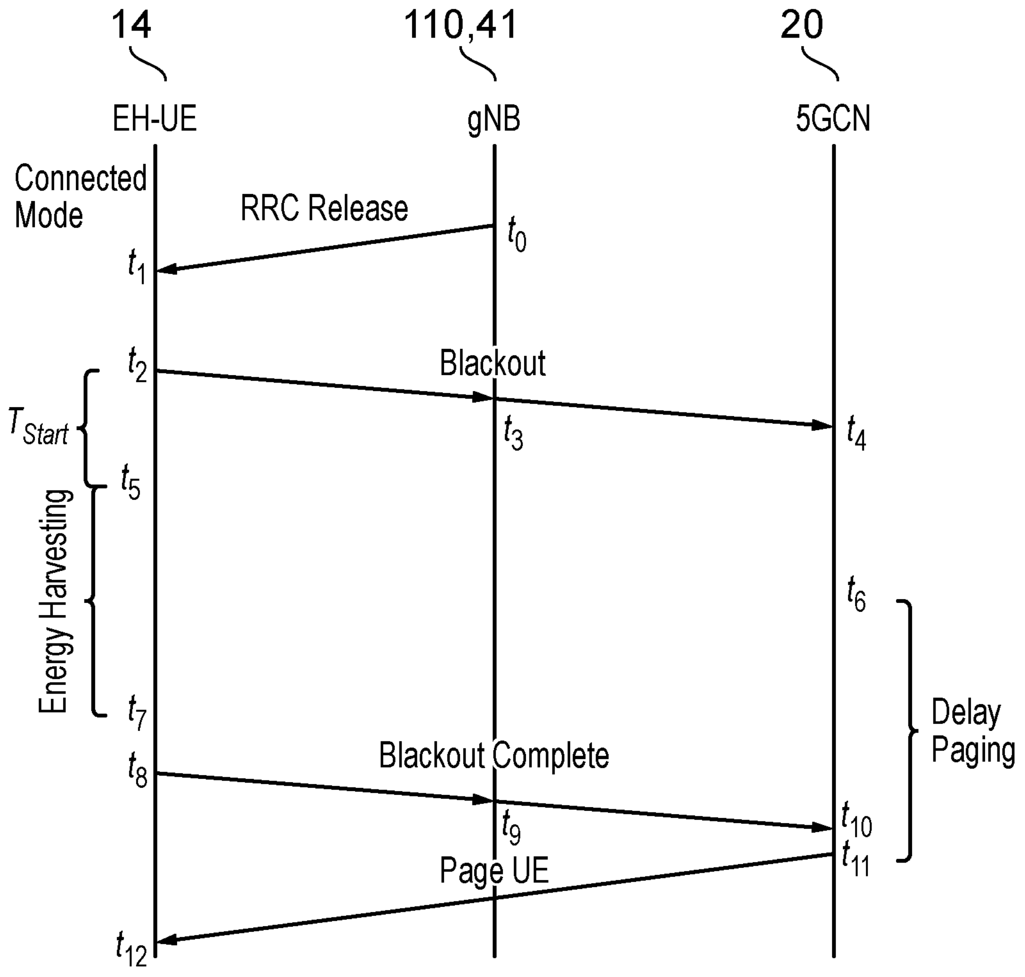
FIG. 9 represents a message flow diagram illustrating an operation of a wireless communication system according to example embodiments in which a blackout complete message includes when a blackout period is completed.

In another embodiment, a blackout complete message is transmitted after the UE has performed sufficient energy harvesting. That is the blackout message indicates that the Blackout Period is completed. Here the network is aware that the UE is in a blackout but does not know when the UE will be back. An example is shown in FIG. 9, where the UE at time $t_2$ indicates to the network that it will go into blackout and here $T_{start}$ is predetermined as per the previous embodiments, e.g. as part of UE capability signalling. The UE starts performing energy harvesting at time $t_5$ but does not know when it would harvest sufficient energy to operate again. At time $t_6$, the network received a message for the UE and since it is aware that the UE is in a blackout, it refrained from paging the UE. At time $t_7$ the UE has harvested sufficient energy and transmits a "blackout complete" message at time $t_8$ to the network. The network receives the "blackout complete" message at time $t_{10}$ and proceeds to page the UE at time $t_{11}$.

In some examples the UE may send some identifier in the blackout message, such as an IMSI or P-TMSI. The gNB will then know which UE is under blackout conditions. The UE can then send the same identifier in the blackout complete message, allowing the gNB to link the blackout and blackout complete messages. In an alternative, the blackout message may contain an identifier of the UE and a UE-generated token. The UE would then send this token in the blackout complete message. Based on receiving the token in the blackout complete message, the gNB can link that token to the token in the original blackout message and hence determine which UE had entered into a blackout phase and managed to harvest energy.

Figure 10:
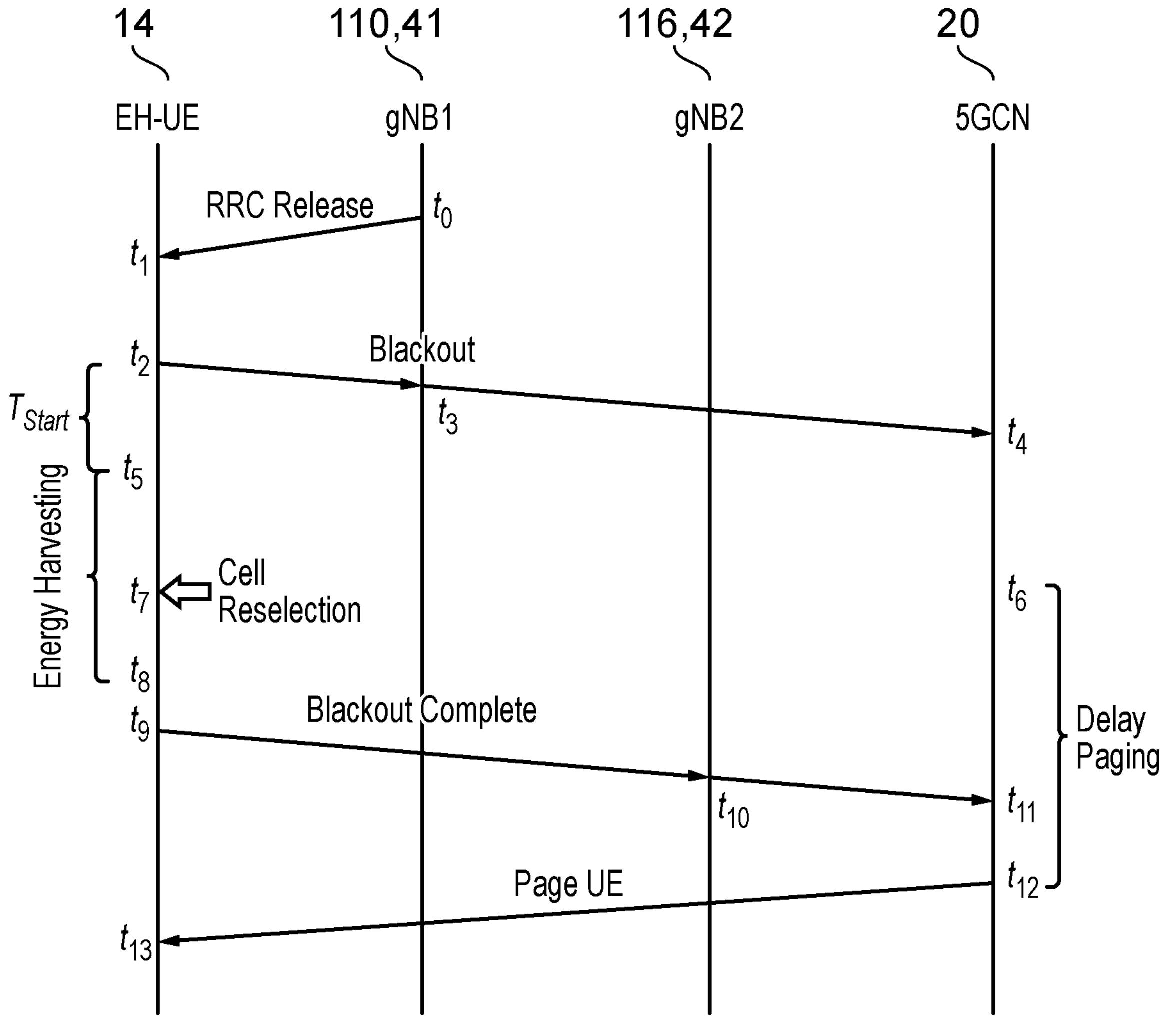
FIG. 10 represents a message flow diagram illustrating an operation of a wireless communication system according to example embodiments in which a blackout complete message is transmitted in a different cell.

An advantage of sending a blackout complete message can be provided if the UE has selected a new cell as a result of a cell reselection procedure. This is because a blackout complete message can provide an indication to the network that the UE had performed cell reselection during the blackout period, since the UE would send the blackout complete message in the new cell in the case that the UE had moved to the new cell resulting from the cell reselection procedure. An example of this is shown in FIG. 10, where the UE moves to Idle Mode at time $t_1$ when the UE is camping on gNB1. The UE sends a blackout message at time $t_2$ to the network and starts its blackout period at time $t_5$. At time $t_6$ the network has a message for the UE but it refrains from paging the UE since it is aware that the UE is in a blackout period. At time $t_7$, the UE performs Cell Reselection and moves from gNB1 to gNB2 whilst still in the blackout period. The UE moves out of the blackout period at time $t_8$. At time $t_9$, the UE sends the said blackout complete message but this time via gNB2 instead of gNB1. The network receives the blackout complete message at time $t_{11}$, and therefore is aware that the UE has moved to gNB2 and hence pages the UE via gNB2 at time $t_{12}$.

In another embodiment, the blackout complete message may contain Cell Reselection information. This Cell Reselection information can provide an identity of the gNB, for example a Cell ID of the gNB where the UE sent the blackout message. For example in FIG. 10, the blackout complete message at time $t_9$ can contain Cell Reselection information indicating to gNB2 that the UE had sent the blackout message in gNB1.

In another embodiment, the blackout complete message is transmitted if the UE performs Cell Reselection during its blackout period. If the blackout message already contains information of the blackout duration, $T_{Blackout}$, then it is unnecessary to further send a blackout complete message to the network since the network knows when the UE will move out of its blackout period, especially if the UE remains in the same cell. However, this embodiment recognizes that the UE may perform Cell Reselection during the blackout period and hence it is beneficial to inform the network of a cell change after its blackout period to avoid escalating the paging message.

Figure 11:
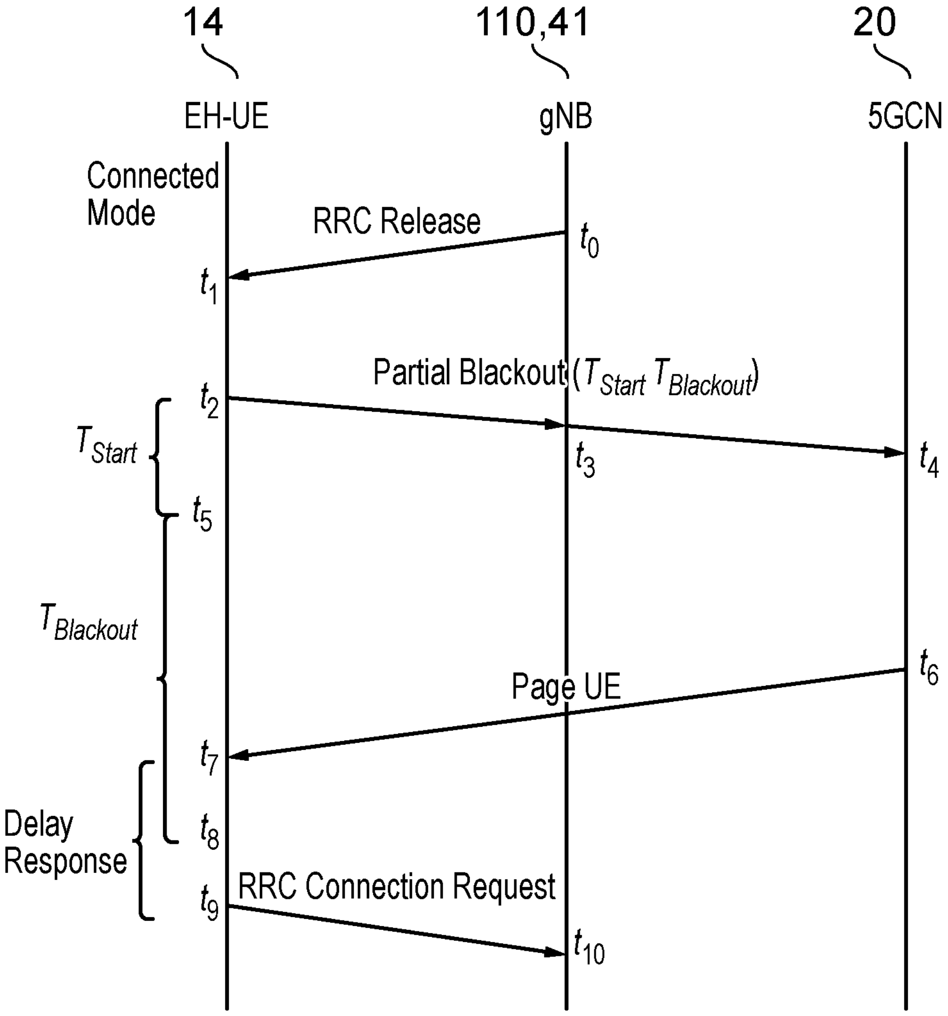
FIG. 11 represents a message flow diagram illustrating an operation of a wireless communication system according to example embodiments in which a blackout message indicates a partial blackout.

In another embodiment, the blackout message indicates a partial blackout, where the UE has sufficient energy to receive a message but insufficient energy to transmit a response. The network can therefore decide to page the UE but will expect a delayed response from the UE. The UE can inform the network when it can respond to the network during this partial blackout period, e.g. using one of the previous embodiments. In some implementations, the UE may be able to receive some signals but not others, for example the UE may have sufficient energy to receive SSB (for synchronisation) but may not have sufficient energy to monitor for a paging message, which requires blind decoding for a PDCCH in a PDCCH search space followed by decoding for a PDSCH carrying the paging message. An example is shown in FIG. 11, where the UE indicates to the network that it will move into blackout at time ts for a duration of TBlackout as per previous embodiments but here the UE indicates a "Partial Blackout" thereby informing the network that the UE is capable of receiving DL messages. At time $t_6$ during the partial blackout period, the network receives a message for the UE and since it is aware that the UE can receive the message, it pages the UE. The UE receives the paging message at time $t_7$ but is unable to respond until it has completed harvesting sufficient energy at time $t_8$. After its partial blackout period, the UE responds to the network at time to with the RRC Connection Request message. Here the network would refrain from escalating after sending the paging message at $t_6$ and would wait for a longer time for the UE to respond.

Figure 12:
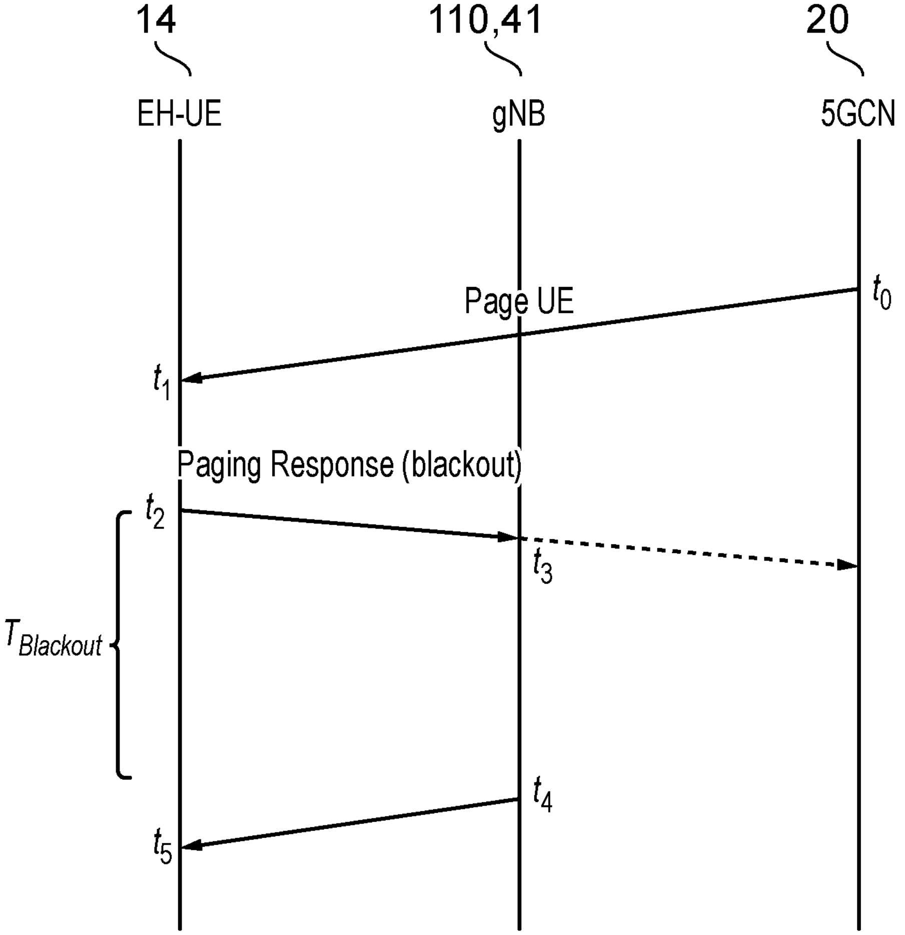
FIG. 12 represents a message flow diagram illustrating an operation of a wireless communication system according to example embodiments in which a blackout message is sent in a paging response.

In another embodiment, the blackout message indicates a partial blackout, where the UE has sufficient energy to receive a message but limited energy to transmit a response. For example, the UE can receive a paging message, but the UE can only transmit the paging response message. The UE would not be able to continue further, such as receiving/transmitting further data. The UE will continue energy harvesting after transmitting the paging response message. The partial blackout message can be sent together/within the paging response message. Operation according to this embodiment is shown in FIG. 12. FIG. 12 shows that the UE is paged at time $t_0$. The UE does not have sufficient energy to complete an RRC connection with the network and hence at time $t_2$ it sends a paging response message indicating a "blackout". The blackout message may contain an indication of how long the blackout is expected to last for, e.g. the UE indicates the time "$T_{Blackout}$". Following the blackout time, the gNB can send a downlink message to the UE, which is shown occurring at time $t_4$. Alternatively, the gNB can send a downlink message to the UE after the reception of a blackout complete indication from the UE (not shown in the figure).

Figure 13:
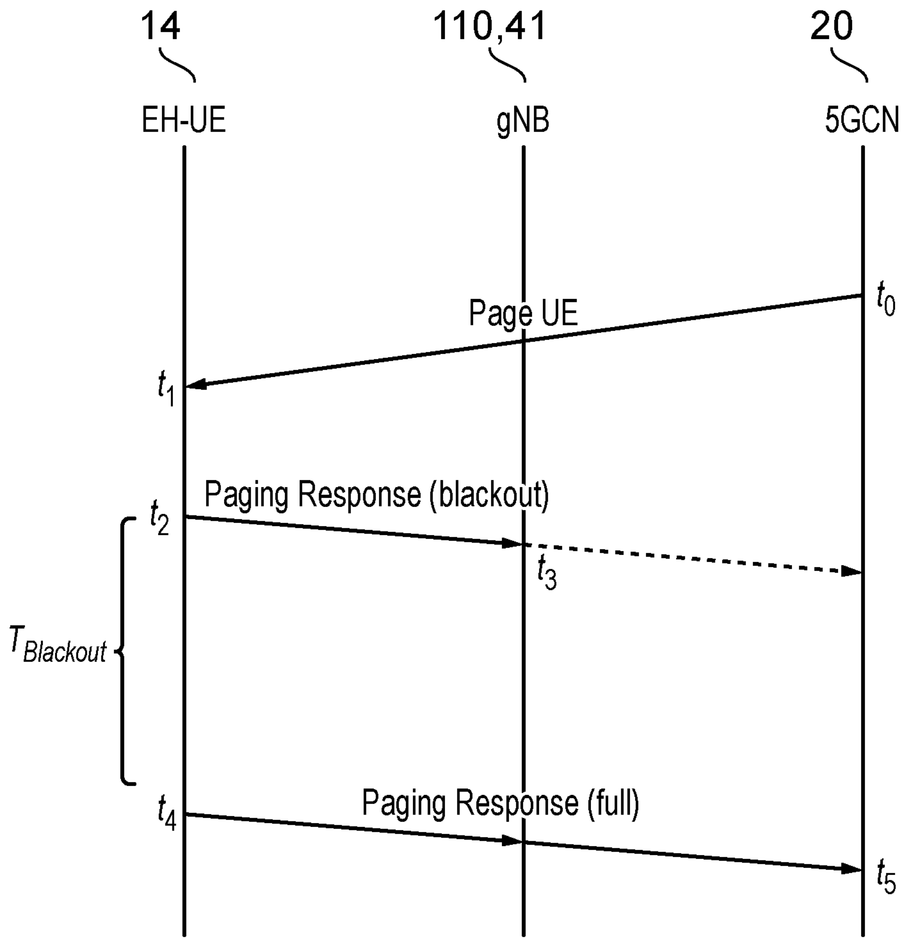
FIG. 13 represents a message flow diagram illustrating an operation of a wireless communication system according to example embodiments in which a paging response is sent when a blackout period is completed.
Figure 14:
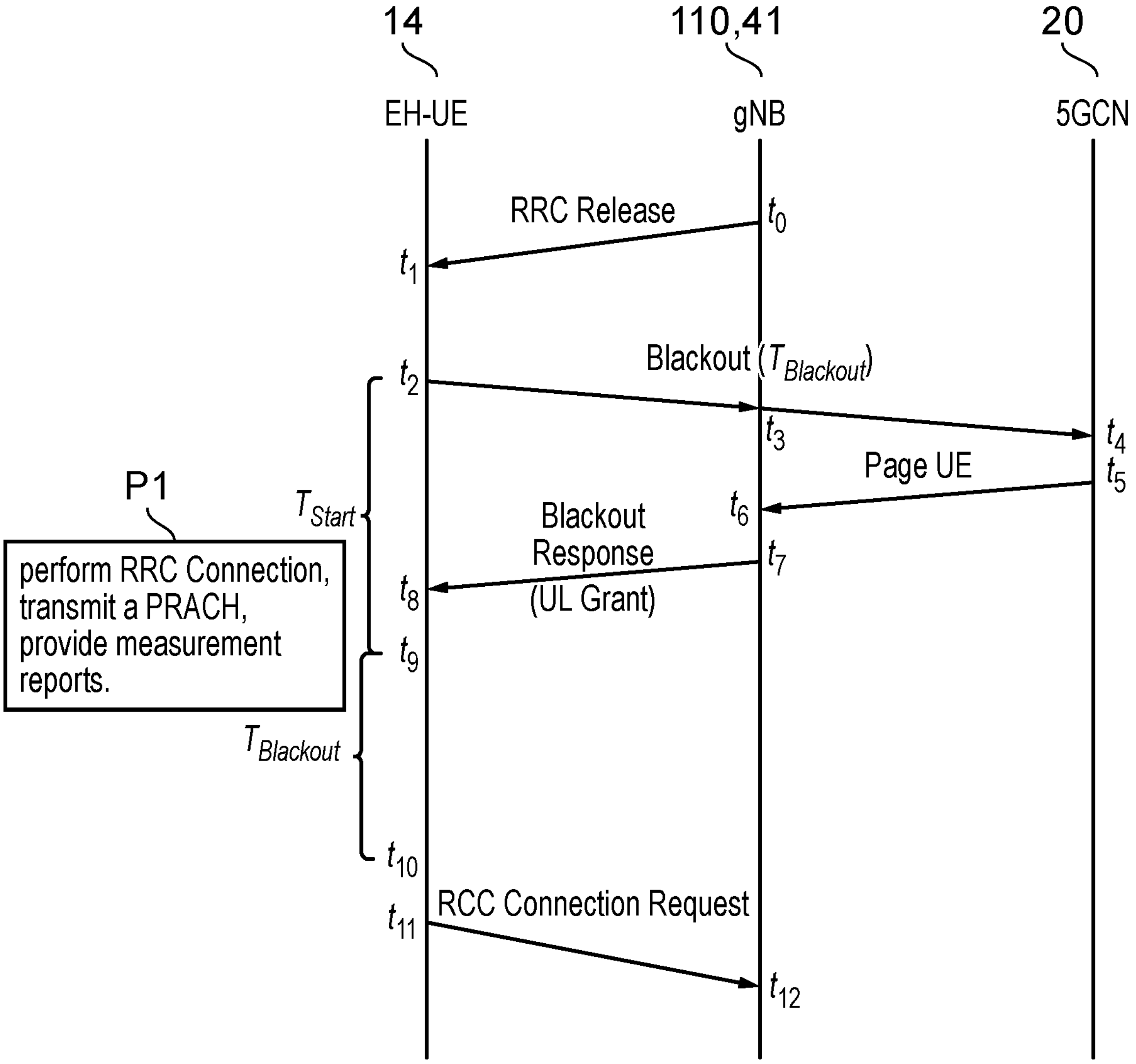
FIG. 14 represents a message flow diagram illustrating an operation of a wireless communication system according to example embodiments in which a wireless communications network sends information with instructions to a user equipment with a blackout response message.

In an alternative embodiment, the UE divides the paging response, so that the UE sends a second paging response message after the blackout period, as shown in FIG. 13. In this case, the first paging response message (at time $t_2$) that contains the "blackout" message essentially indicates to the gNB that the UE will defer transmission of the paging response message. The UE sends the deferred paging response message at time $t_4$ following the blackout period, i.e. once the EH-UE has replenished its energy store. In another embodiment, the network can send a Blackout Response message to the UE after receiving a blackout message from the UE. This Blackout Response message contains instructions for the UE for what the UE should do when the UE completes its blackout, e.g. perform RRC Connection, transmit a PRACH, provide measurement reports etc. The network can also provide in the Blackout Response message, UL grants for the UE to transmit RRC messages, measurement reports or DL grants for the UE to receive further instructions. An example of this is shown FIG. 14, where at time $t_2$, the UE sends a blackout message to the gNB indicating a duration of $T_{Blackout}$. The start of the blackout, i.e., $T_{Start}$ is assumed to be known between gNB and UE, e.g. using one of the previous embodiments. Prior to the start of the blackout, the network receives a message for the UE at time $t_5$, and the core network node informs the gNB. The gNB then sends a Blackout Response message to the UE with an UL Grant, where here the gNB instructs the UE to perform P1 an RRC Connection upon completing its blackout, or any other operations such as transmitting a PRACH and/or providing measurement reports using the UL resources in the UL Grant. The UE then goes into blackout at time $t_9$ to $t_{10}$. Upon completion of its blackout, the UE uses the UL Grant provided by the gNB in the Blackout Response message to perform an RRC Connection Request at time $t_{11}$.

In another embodiment, the blackout message, described in previous embodiments, is sent in Connected Mode and the UE moves to Idle Mode to harvest energy. This recognizes that the UE may have depleted its power during Connected Mode and therefore requests to move to Idle Mode to harvest energy.

Transmission of the Blackout Message

As will be appreciated from the embodiments described above, a UE and a network operate in order to accommodate a blackout of the UE, as a result of energy harvesting for example. In that respect the following embodiments describe how the blackout message is transmitted because there can be various options. The following embodiments therefore describe how the blackout message is transmitted.

In an embodiment, the blackout message is transmitted in a Preconfigured Uplink Resource (PUR) or a Configured Grant PUSCH (CG-PUSCH). The network can configure UEs with PUR and/or CG-PUSCH resources for use in Idle Mode for early data transmission purposes, where the UE can use these uplink resources if it has a valid Timing Advance.

In another embodiment, the blackout message is transmitted in a PUSCH in connection to the RRC release operation. Once the UE receives the RRC release message, the UE transmits the blackout message in the PUSCH, indicating when the blackout period will occur at the UE side. This is particularly the case when the UE battery level is relatively low (e.g. below a certain level/threshold) but the UE can still maintain communication for a relatively short time.

In another embodiment, the blackout message is transmitted using a PRACH. The network can configure the UE with a PRACH of a specific sequence or in a pre-determined PRACH resource such that the gNB recognizes that this PRACH is an indication of a blackout. The gNB can configure the UE with different PRACH sequences to indicate different blackout durations as per previous embodiments.

With reference to FIG. 9 the blackout complete message can be transmitted to the gNB using PRACH resources. Hence, once the UE has gained sufficient charge/energy via EH, it transmits a PRACH. The PRACH can use preconfigured resources or initial access resources. For an example in which the UE performs Cell Reselection during its blackout period, then the network may configure a known PRACH sequence representing blackout complete to multiple neighbour cells.

In another embodiment, the blackout message is transmitted in Message 3. Message 3 is the $3^{rd}$ message in a 4-step RACH process where the UE typically transmits the RRC Connection Request message. However, here the UE uses Message 3 to transmit the blackout message either together with the RRC Connection Request message, for example, for indicating "blackout complete" as per previous embodiments or standalone blackout messages without the RRC Connection Request message. The standalone blackout message in Message 3 can be a corresponding message to the blackout PRACH sequence. That is the UE first transmits a PRACH indicating blackout and after receiving Message 2 from the network, it transmits further information regarding the blackout in Message 3, e.g. duration, start time of blackout and/or whether it is partial or full blackout.

In another embodiment, the blackout message is transmitted in Message A. Message A is the $1^{st}$ message in a 2-step RACH process where the UE transmits a PRACH followed by a PUSCH containing RRC Connection Request. There is a predetermined mapping between the PRACH and the follow up PUSCH. Similar to the previous embodiment, the PRACH can indicate a blackout and the follow up PUSCH contains further information regarding the blackout.

Figure 15:
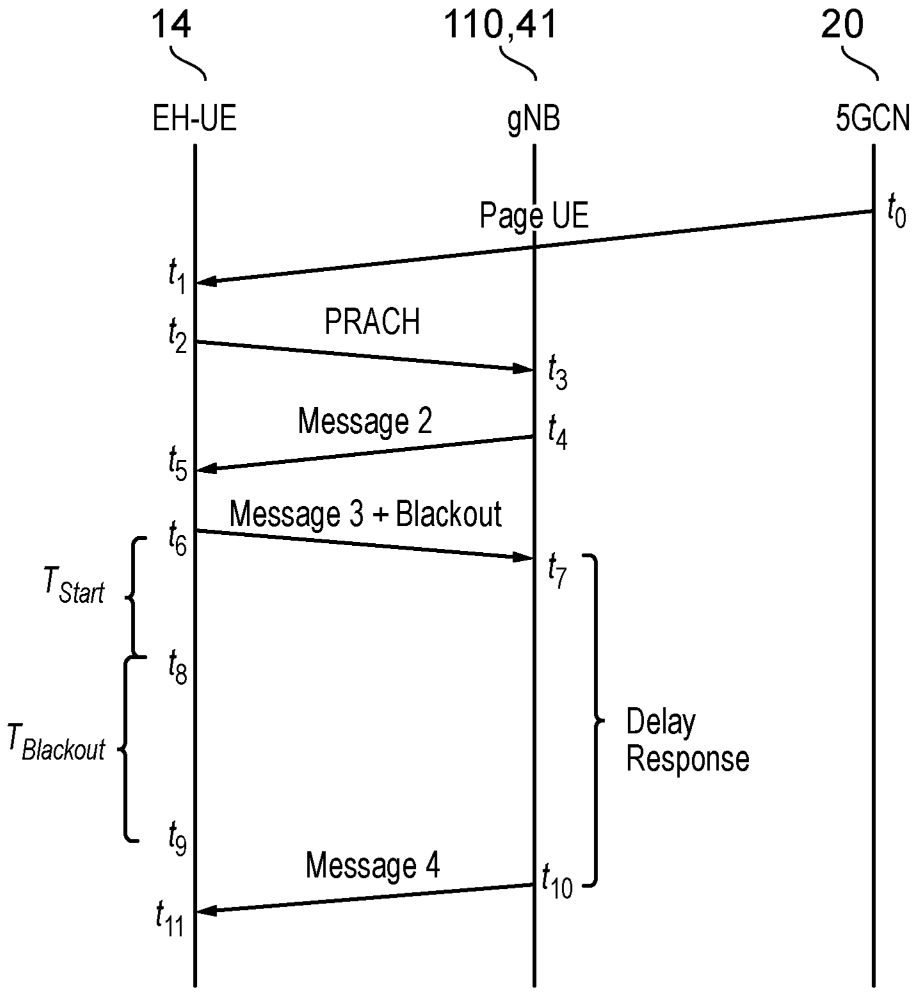
FIG. 15 represents a message flow diagram illustrating an operation of a wireless communication system according to example embodiments in which a blackout message is transmitted in response to paging.

In another embodiment, the blackout message is transmitted as part of a response to a paging message. That is transmitting the blackout message in PRACH, Message 3 or Message A after receiving a paging message from the network, which would inform the network to delay expecting a response from the UE or tell the network to try again later. An example embodiment is shown in FIG. 15, where the blackout message is in Message 3 as part of a response to the paging from the network. Here the UE is already in Idle Mode and the network pages the UE at time $t_0$. The UE has sufficient energy to transmit a PRACH and receive Message 2 from the network. However, the UE realises that it would not have sufficient energy to move into Connected Mode and so it transmits Message 3 with a blackout message indicating that it will blackout for $T_{Blackout}$ duration. The gNB is then aware that the UE has entered into a blackout and delays transmitting Message 4. Alternatively, the UE can still receive Message 4 to complete the RACH procedure but the gNB expects the subsequent transmission (after Message 4) to be delayed as the UE has entered into a blackout period.

Figure 16:
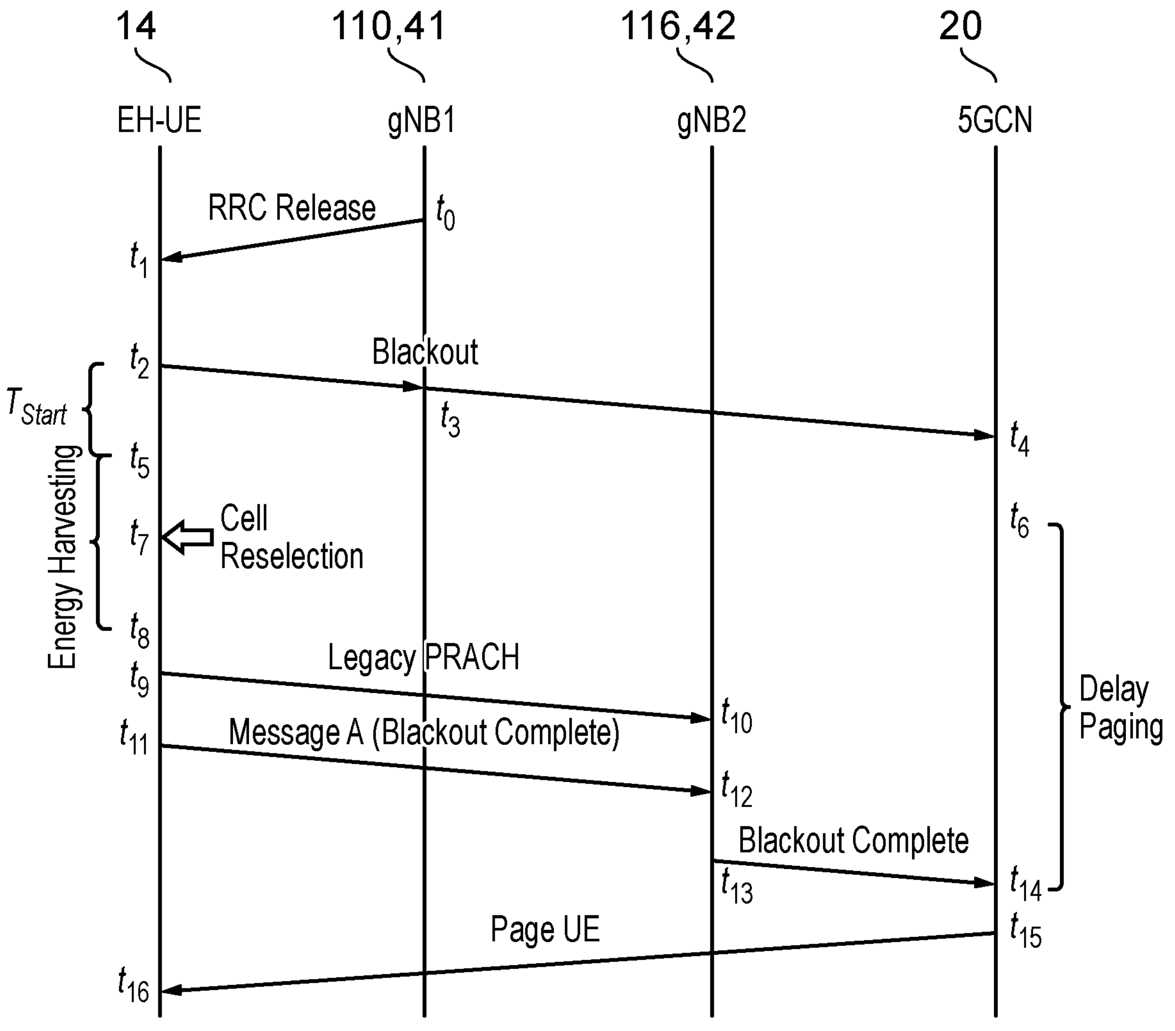
FIG. 16 represents a message flow diagram illustrating an operation of a wireless communication system according to example embodiments in which a blackout complete message is sent to a different infrastructure equipment as part of a random access procedure.

In another embodiment, the blackout complete message is transmitted using Message 3 or Message A. This is beneficial for cases where PUR, CG-PUSCH and/or special PRACH for blackout messages are not configured in a cell, especially in a cell that the UE has moved to during its blackout period. An example is shown in FIG. 16, where the UE moves to Idle Mode at time $t_1$ whilst in gNB1. It sends a blackout message at time $t_2$ to the network and moves to its blackout period in time $t_5$. At time $t_6$, the network receives a message for this UE but since it is aware that the UE is in a blackout, it refrains from sending the paging message to the UE. At time $t_7$, the UE performs Cell Reselection where it moves from gNB1 to gNB2. Here gNB2 is configured with 2-step RACH but it is not configured with special PRACH, PUR or CG-PUSCH for Idle Mode operations and so the UE needs to use the legacy 2-step PRACH in gNB2. The UE completes its blackout period at time $t_8$ and sends a legacy 2-step PRACH to gNB2 at time $t_9$ followed by a corresponding PUSCH carrying Message A at time $t_{11}$. As per this embodiment, the Message A also carries a blackout complete message and gNB2 signals to the network that the UE has completed its blackout period at time $t_{13}$. The network is then aware that the UE has moved to gNB2 since the blackout complete message comes from gNB2 and hence it pages the UE at time $t_{15}$ via gNB2 thereby avoiding escalating the paging.

In another embodiment, the blackout message is transmitted in the TAU, i.e. when the UE updates its Tracking Area. That is the TAU (Tracking Area Update) message contains one or more of the said blackout messages.

As will be understood from the embodiments described above, according to another aspect there is provided a wireless communications network for transmitting data to or receiving data from communications devices, the wireless communications network comprising a plurality of one or more infrastructure equipment providing a radio network part of the wireless communications network, each of the plurality of infrastructure equipment forming a cell of the wireless communications network and providing within the cell a wireless access interface for transmitting data to the communications devices or receiving data from the communications devices. The wireless communications network also includes a core network part for transmitting the data to one or more of the plurality of infrastructure equipment of the radio network part for transmitting by the infrastructure equipment to one of the communications devices or for receiving the data from the one or more of the plurality of infrastructure equipment of the radio network part which has been received from one of the communications devices by the one or more infrastructure equipment. The core network part is configured, in response to determining that data is to be transmitted to a communications device, to identify one of the plurality of infrastructure equipment to which the communications device was last connected from which the infrastructure equipment either received data from the communications device or transmitted data to the communications device when in a connected mode, and to control the infrastructure equipment to which the communications device was last connected to transmit a paging message for the communications device indicating that the communications device should operate in a connected mode to receive the data, wherein the core network is configured to determine whether a blackout message has been received from the communications device, which was transmitted via one of the infrastructure equipment, and if the communications device transmitted a blackout message to delay transmission of the paging message.

Embodiments of the present disclosure are defined by the following numbered paragraphs:

Paragraph 1. A user equipment forming a wireless communications device operating with a wireless communications network, the user equipment comprising transceiver circuitry configured to transmit signals via a wireless access interface of the wireless communications network and configured to receive signals transmitted via the wireless access interface, control circuitry configured to control the transceiver circuity to transmit the signals to or receive the signals from the wireless communications network, and an energy storage device configured to provide energy to at least the transceiver circuitry for transmitting the signals to or receiving the signals from the wireless communications network, wherein the control circuitry is configured to determine, during an idle or inactive mode in which the user equipment has no active connection for transmitting data to or receiving data from the wireless communications network, that an amount of energy which is available from the energy storage device will be insufficient for operating the transceiver circuitry during a blackout period, during which the transceiver circuitry cannot receive one or more signals transmitted from the wireless communications network or transmit signals to the wireless communications network, and to transmit to the wireless communications network a blackout message indicating that the user equipment cannot receive one or more signals transmitted from the wireless communications network for the blackout period.

Paragraph 2. A user equipment according to paragraph 1, wherein the blackout message includes an indication of a start time of a blackout period representing a time after which the user equipment will not be able to receive signals from the wireless communications network or transmit signals to the wireless communications network.

Paragraph 3. A user equipment according to paragraph 1, wherein the start time in the blackout message is indicated as an offset in a number of time slots of the wireless access interface from a time slot in which the blackout message was transmitted or an absolute radio frame of the wireless access interface.

Paragraph 4. A user equipment according to paragraph 1, wherein the start time of the blackout period when the transceiver circuit will not be able to receive signals from the wireless communications network or to transmit signals to the wireless communications network is pre-configured.

Paragraph 5. A user equipment according to any of paragraphs 1 to 4, wherein the blackout message includes an indication of a duration of the blackout period when the transceiver circuit will not be able to receive signals from the wireless communications network or transmit signals to the wireless communications network.

Paragraph 6. A user equipment according to any of paragraphs 1 to 5, wherein the control circuitry is configured to monitor, during the blackout period, an amount of energy available from the energy storage device, to determine that there is sufficient energy which can be provided from the energy storage device to operate the transceiver circuitry, and to transmit a blackout complete message to the wireless communications network indicating that the user equipment can receive signals.

Paragraph 7. A user equipment according to paragraph 6, wherein the blackout message and the blackout complete message include an identifier of the user equipment.

Paragraph 8. A user equipment according to paragraph 7, wherein the blackout message includes an identifier of the user equipment and a token generated by the user equipment and the blackout complete message includes the token.

Paragraph 9. A user equipment according to any of paragraphs 6, 7 or 8, wherein the control circuitry is configured to control the transceiver circuitry to transmit the blackout message to a first of a plurality of infrastructure equipment of the wireless communications network, to perform an idle mode reselection of a cell of the wireless communications network and to control the transceiver circuitry to transmit the blackout complete message to a second of the plurality of infrastructure equipment selected by the control circuitry in accordance with the idle mode reselection.

Paragraph 10. A user equipment according to any of paragraphs 1 to 5, wherein the control circuitry is configured to control the transceiver circuitry to transmit the blackout message to a first of a plurality of infrastructure equipment, to perform an idle mode reselection procedure of a cell of the wireless communications network, and if the control circuitry has selected a second cell formed by a second of the plurality of infrastructure equipment, to control the transceiver circuitry to transmit a blackout complete message to the second infrastructure equipment forming the second cell, or if the control circuitry has selected the first cell formed by the first infrastructure equipment during the idle mode reselection procedure to which the blackout message was transmitted, not to transmit the blackout complete message.

Paragraph 11. A user equipment according to paragraph 9 or 10, wherein the blackout complete message contains cell selection information indicating the infrastructure equipment to which the blackout message was sent.

Paragraph 12. A user equipment according to paragraph 10 or 11, wherein the blackout message and the blackout complete message include an identifier of the user equipment.

Paragraph 13. A user equipment according to paragraph 12, wherein the blackout message includes an identifier of the user equipment and a token generated by the user equipment and the blackout complete message includes the token.

Paragraph 14. A user equipment according to any of paragraphs 1 to 5, wherein the control circuitry is configured to determine that there is insufficient energy for the transceiver circuitry to receive the signals from the wireless communications network, and insufficient energy for the transceiver circuitry to transmit a response to the signals received from the wireless communications network, the blackout message including an indication of a full blackout indicating that the user equipment cannot receive signals and cannot transmit signals.

Paragraph 15. A user equipment according to any of paragraphs 1 to 5, wherein the control circuitry is configured to determine that there is sufficient energy which can be provided from the energy storage device to the transceiver circuitry for the transceiver circuitry to receive the signals from wireless communications network, and insufficient energy for the transceiver circuitry to transmit a response to the signals received from wireless communications network, the blackout message including an indication of a partial blackout indicating that the user equipment can receive signals but not respond to the receive signals, and to receive, during the blackout period, a paging message from the wireless communications network.

Paragraph 16. A user equipment according to paragraph 15, wherein the control circuitry is configured to control the transceiver circuitry to transmit a response to the paging message, after the blackout period, indicating a radio resource control, RRC, connection request message.

Paragraph 17. A user equipment according to any of paragraphs 1 to 4, wherein the control circuitry is configured to determine that there is sufficient energy which can be provided from the energy storage device to the transceiver circuitry for the transceiver circuitry to receive a paging message from the wireless communications network, to transmit a response to the paging message and insufficient energy for the transceiver circuitry to receive data from the wireless communications network associated with the paging message, the blackout message including an indication of a partial blackout that the user equipment can receive a paging message, transmit a response to the paging message but not to receive data from the wireless communications network, to receive a paging message from the wireless communications network, and to transmit a paging response message, wherein the blackout message including the indication of the partial blackout is transmitted with the paging response message.

Paragraph 18. A user equipment according to paragraph 17, wherein the blackout message includes an indication of a length of the blackout period and the control circuitry is configured to control the transceiver circuitry to receive the data associated with the paging message after the end of the blackout period indicated in the blackout message.

Paragraph 19. A user equipment according to any of paragraphs 1 to 4, wherein the control circuitry is configured to determine that there is sufficient energy which can be provided from the energy storage device to the transceiver circuitry for the transceiver circuitry to receive a paging message from the wireless communications network, to transmit a response to the paging message and insufficient energy for the transceiver circuitry to receive data from the wireless communications network associated with the paging message, the blackout message including an indication of a partial blackout indicting that the user equipment can receive a paging message, transmit a response to the paging message but not to receive data from the wireless communications network, to receive a paging message from the wireless communications network, and to transmit the blackout message in response to the paging message, wherein the blackout message transmitted in response to the paging message indicates to the wireless communications network that the user equipment will transmit a response to the paging message after the blackout period, and to transmit, after the blackout period, a paging response message to the wireless communications network.

Paragraph 20. A user equipment according to paragraph 19, wherein the paging response message includes a radio resource control, RRC, connection request message.

Paragraph 21. A user equipment according to any of paragraphs 1 to 4, wherein the control circuitry is configured to control the transceiver circuitry to receive, in response to the blackout message, a blackout response message from the wireless communications network, the blackout response message indicating a procedure which the UE should follow after the blackout period ends.

Paragraph 22. A user equipment according to paragraph 21, wherein the procedure which the UE should follow after the blackout period ends, includes one or more of performing an RRC connection procedure, transmitting a physical random access channel, PRACH, preamble or providing measurement reports.

Paragraph 23. A user equipment according to paragraph 22, wherein the blackout response message includes an uplink grant of resources of the wireless communications access interface for transmitting one or both of RRC messages or measurement reports, or a downlink grant of resources of the wireless communications access interface for receiving further instructions.

Paragraph 24. A user equipment according to any of paragraphs 1 to 22, wherein the control circuitry is configured to control the transceiver circuitry to transmit the blackout message in a preconfigured uplink resource, PUR, or a configured grant physical uplink shared channel, CG-PUSCH.

Paragraph 25. A user equipment according to any of paragraphs 1 to 23, wherein the control circuitry is configured to control the transceiver circuitry to transmit the blackout message in a physical uplink shared channel, PUSCH, as part of an RRC release operation.

Paragraph 26. A user equipment according to any of paragraphs 1 to 23, wherein the control circuitry is configured to control the transceiver circuitry to transmit the blackout message using a physical random access channel, PRACH.

Paragraph 27. A user equipment according to any of paragraphs 1 to 4, wherein the control circuitry is configured to control the transceiver circuitry to transmit the blackout message as part of a PRACH procedure to establish an RRC connection in response to a paging message.

Paragraph 28. A user equipment according to any of paragraphs 1 to 4, wherein the control circuitry is configured to determine that there is sufficient energy which can be provided from the energy storage device to the transceiver circuitry for the transceiver circuitry to receive a paging message from the wireless communications network, to transmit a response to the paging message and insufficient energy for the transceiver circuitry to establish an RRC connection associated with the paging message, the blackout message including an indication of a partial blackout that the user equipment can receive a paging message, transmit a response to the paging message but not to establish an RRC connection with the wireless communications network, to receive a paging message from the wireless communications network, to transmit a PRACH message, for establishing an RRC connection, as part of a 4-step RACH procedure, to receive a response to the PRACH message as message 2 from the wireless communications network, and to transmit the blackout message with an RRC connection request message as message 3 of the 4-step RACH procedure, wherein the blackout message indicates to the wireless communications network that the user equipment will receive a response to the message 3 after the blackout period, and to receive, after the blackout period, a response to the RRC connection request message as message 4 of the 4-step RACH procedure from the wireless communications network.

Paragraph 29. A user equipment according to any of paragraphs 1 to 4, wherein the control circuitry is configured to determine that there is sufficient energy which can be provided from the energy storage device to the transceiver circuitry for the transceiver circuitry to receive a paging message from the wireless communications network, to transmit a response to the paging message and insufficient energy for the transceiver circuitry to establish an RRC connection associated with the paging message, the blackout message including an indication of a partial blackout that the user equipment can receive a paging message, transmit a response to the paging message but not to establish an RRC connection with the wireless communications network, to receive a paging message from the wireless communications network, to transmit a PRACH message, requesting an RRC connection, as part of a 4-step RACH procedure, wherein the blackout message is transmitted as the PRACH message to receive a response to the PRACH message as message 2 from the wireless communications network, wherein the blackout message indicates to the wireless communications network that the user equipment will transmit an RRC connection request message as message 3 of the 4-step RACH procedure after the blackout period, to transmit an RRC connection request message as message 3 of the 4-step RACH procedure after the end of the blackout period, and to receive a response to the RRC connection request message as message 4 of the 4-step RACH procedure from the wireless communications network.

Paragraph 30. A user equipment according to any of paragraphs 6, 7 or 8, wherein the control circuitry is configured to control the transceiver circuitry to transmit the blackout message to a first of a plurality of infrastructure equipment of the wireless communications network forming a first cell, to perform an idle mode reselection procedure to select a second cell formed by a second of the plurality of infrastructure equipment of the wireless communications network and to control the transceiver circuitry to transmit a message A of a 2-step RACH procedure, the message A including the blackout complete message as a message A of a 2-step RACH procedure to the second of the plurality of infrastructure equipment, and to receive a paging message from the second infrastructure equipment.

Paragraph 31. A user equipment according to any of paragraphs 6, 7 or 8, wherein the control circuitry is configured to control the transceiver circuitry to transmit the blackout message to a first of a plurality of infrastructure equipment forming a first cell, to perform an idle mode reselection procedure to select a second cell formed by a second of the plurality of infrastructure equipment of the wireless communications network and to control the transceiver circuitry to transmit a message 3 of a 4-step RACH procedure, the message 3 including the blackout complete message as a message 3 of a 4-step RACH procedure to the second of the plurality of infrastructure equipment, and to receive a paging message from the second infrastructure equipment.

Paragraph 32. A user equipment according to any preceding paragraph, wherein the control circuitry is configured with the transceiver circuitry to perform a cell reselection procedure by receiving signals from a plurality of cells of the wireless communications network and selecting a cell from one of the plurality of cells based on the received signals, and to transmit the blackout message to the wireless communications network indicating that the user equipment cannot receive one or more signals transmitted from the selected cell of the wireless communications network.

Paragraph 33. A user equipment according to any preceding paragraph, wherein the idle mode or inactive mode is a Radio Resource Control, RRC, Idle Mode.

Paragraph 34. A user equipment according to any of paragraphs 1 to 31, wherein the control circuitry is configured with the transceiver circuitry to transition from a Radio Resource Control, RRC, connected mode in which data is transmitted to or received from an infrastructure equipment of a cell of the wireless communications network formed by the infrastructure equipment, to an RRC Idle mode in which the user equipment has no RRC connection, and to transmit the blackout message to the infrastructure equipment of the wireless communications network to which the user equipment had transmitted data or from which the user equipment had received data in RRC connected mode.

Paragraph 35. A user equipment according to any of paragraphs 1 to 31, wherein the control circuitry is configured with the transceiver circuitry to transmit the blackout message to an infrastructure equipment of the wireless communications network to which the user equipment had transmitted data or from which the user equipment had received data in RRC connected mode, and to transition from a Radio Resource Control, RRC, connected mode in which data is transmitted to or received from the infrastructure equipment of a cell of the wireless communications network formed by the infrastructure equipment, to an RRC Idle mode or an RRC Inactive mode in which the user equipment has no RRC connection.

Paragraph 36. A method of operating a communications device, the method comprising determining, during an idle or inactive mode in which the communications device has no active connection for transmitting data to or receiving data from the wireless communications network, using a transceiver circuit, that an amount of energy which is available from an energy storage device configured to provide energy to the transceiver circuitry will be insufficient for operating the transceiver circuitry during a blackout period, during which the transceiver circuitry cannot receive one or more signals transmitted from an infrastructure equipment of the wireless communications network or transmit signals to the infrastructure equipment, and transmitting, by the communications device using the transceiver circuit to the infrastructure equipment, a blackout message indicating that the communications device cannot receive one or more] signals transmitted from the wireless communications network for the blackout period.

Paragraph 37. A method according paragraph 36, wherein the blackout message includes an indication of a duration of the blackout period when the transceiver circuit will not be able to receive signals from the infrastructure equipment or transmit signals to the infrastructure equipment.

Paragraph 38. A method according to paragraph 36 or 37, comprising monitoring, during the blackout period, an amount of energy available from the energy storage device, determining that there is sufficient energy which can be provided from the energy storage device to operate the transceiver circuitry, and transmitting a blackout complete message to the wireless communications network indicating that the user equipment can receive signals.

Paragraph 39. A method according to paragraph 38, wherein the blackout message and the blackout complete message include an identifier of the communications device.

Paragraph 40. A wireless communications network for transmitting data to or receiving data from communications devices, the wireless communications network comprising a plurality of infrastructure equipment providing a radio network part of the wireless communications network, each of the plurality of infrastructure equipment forming one or more cells of the wireless communications network and providing within each cell a wireless access interface for transmitting data to the communications devices or receiving data from the communications devices, a core network part for transmitting the data to one or more of the plurality of infrastructure equipment of the radio network part for transmitting by the infrastructure equipment to one or more of the communications devices or for receiving the data from the one or more of the plurality of infrastructure equipment of the radio network part which has been received from the communications devices by the one or more infrastructure equipment, the core network part being configured in response to determining that data is to be transmitted to a communications device, to identify one of the plurality of infrastructure equipment, to control the identified infrastructure equipment to transmit a paging message for the communications device indicating that the communications device should operate in a connected mode to receive the data, wherein the core network is configured to determine whether a blackout message has been received from the communications device, which was transmitted via one of the infrastructure equipment, and, if the communications device transmitted a blackout message, to delay transmission of the paging message.

Paragraph 41. A wireless communications network according to paragraph 40, wherein the blackout message includes an indication of a duration of the blackout period when the communications device will not be able to receive signals from the wireless communications network or transmit signals to the wireless communications network, and the core network part is configured to delay transmission of the paging message if the blackout message has been received from the communications device, by an amount of time based on the blackout period.

Paragraph 42. A wireless communications network according to paragraph 40, wherein the core network part is configured to receive a blackout complete message indicating that the user equipment can receive signals, and in response to receiving the blackout complete message to transmit the paging message.

Paragraph 43. A wireless communications network according to paragraph 42, wherein the blackout message and the blackout complete message include an identifier of the communications device.

Paragraph 44. A wireless communications network according to paragraph 43, wherein the blackout message is received from a first cell formed by a first of the plurality of infrastructure equipment, and the blackout complete message is received from a second cell formed by a second of the plurality of infrastructure equipment, and the core network is configured to identify the second cell from which to transmit the paging message to the communications device based on the identifier of the communications device received with the blackout message received from the first cell and the blackout complete message which was received from the second cell, and to transmit the paging message to the communications device from the second cell.

Paragraph 45. A wireless communications network according to paragraph 44, wherein the blackout complete message contains cell selection information indicating the first cell in which the blackout message was sent.

Paragraph 46. A method of operating a wireless communications network for transmitting data to or receiving data from communications devices, the method comprising identifying one of a plurality of infrastructure equipment, in response to determining that data is to be transmitted to a communications device, the plurality of infrastructure equipment providing a radio network part of the wireless communications network, each of the plurality of infrastructure equipment forming one or more cells of the wireless communications network and providing within each cell a wireless access interface for transmitting data to the communications devices or receiving data from the communications devices, controlling the identified infrastructure equipment to transmit a paging message for the communications device indicating that the communications device should operate in a connected mode to receive the data, determining whether a blackout message has been received from the communications device, which was transmitted via one of the infrastructure equipment, and delaying transmission of the paging message, if the communications device transmitted the blackout message.

Paragraph 47. A method according to paragraph 46, wherein the blackout message includes an indication of a duration of the blackout period when the communications device will not be able to receive signals from the wireless communications network or transmit signals to the wireless communications network, and the delaying transmission of the paging message comprises delaying transmission of the paging message by an amount of time based on the blackout period.

Paragraph 48. A method according to paragraph 47, the method comprises receiving the blackout message, wherein the delaying transmission of the paging message comprises receiving a blackout complete message indicating that the user equipment can receive signals, and in response to receiving the blackout complete message, transmitting the paging message.

Paragraph 49. A method according to paragraph 48, wherein the blackout message and the blackout complete message include an identifier of the communications device.

Paragraph 50. A method according to paragraph 49, wherein the receiving the blackout message comprises receiving the blackout message from a first cell formed by a first of the plurality of infrastructure equipment, and the receiving the blackout complete message comprises receiving the blackout complete message from a second cell formed by a second of the plurality of infrastructure equipment, wherein the delaying transmission of the paging message comprises identifying the second cell from which to transmit the paging message to the communications device based on the identifier of the communications device received with the blackout message received from the first cell and the blackout complete message which was received from the second cell, and transmitting the paging message to the communications device from the second cell.

Paragraph 51. A method according to paragraph 50, wherein the blackout complete message contains cell selection information indicating the first cell in which the blackout message was sent.

Paragraph 52. Circuitry for a user equipment operating with a wireless communications network, the circuitry comprising transceiver circuitry configured to transmit signals via a wireless access interface of the wireless communications network and configured to receive signals transmitted via the wireless access interface, control circuitry configured to control the transceiver circuity to transmit the signals to or receive the signals from the wireless communications network, and an energy storage device configured to provide energy to at least the transceiver circuitry for transmitting the signals to or receiving the signals from the wireless communications network, wherein the control circuitry is configured to determine, during an idle or inactive mode in which the user equipment has no active connection for transmitting data to or receiving data from the wireless communications network, that an amount of energy which is available from the energy storage device will be insufficient for operating the transceiver circuitry during a blackout period, during which the transceiver circuitry cannot receive one or more signals transmitted from the wireless communications network or transmit signals to the wireless communications network, and to transmit to the wireless communications network a blackout message indicating that the user equipment cannot receive one or more signals transmitted from the wireless communications network for the blackout period.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a machine-readable medium (in particular, a non-transitory machine-readable medium) carrying such software, such as an optical disk, a magnetic disk, semiconductor memory or the like, is also considered to represent an embodiment of the present disclosure. In particular, the present disclosure should be understood to include a non-transitory storage medium comprising code components which cause a computer to perform any of the disclosed method(s).

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

REFERENCES

[1] Holma H. and Toskala A, "LTE for UMTS OFDMA and SC-FDMA based radio access", John Wiley and Sons, 2009.
[2] D. Ma, G. Lan, M. Hassan, W. Hu and S. K. Das, "Sensing, Computing, and Communications for Energy Harvesting IoTs: A Survey," in *IEEE Communications Surveys & Tutorials*, vol. 22, no. 2, pp. 1222-1250, Secondquarter 2020
[3] RP-211574, "Revised WID on support of reduced capability NR devices," Ericsson, RAN #92e
[4] RP-190727, "New WID: UE Power Saving in NR," CATT, CAICT, RAN #83
[5] RP-200938, "Revised WID UE Power Saving Enhancements for NR," MediaTek, RAN #88e
[6] RWS-210302, "IoT Features in Rel-18," Sony, RAN Rel-18 Workshop
[7] RWS-210313, "Motivation for Rel-18 WI on Enhanced RedCap," Ericsson, RAN Rel-18 Workshop
[8] RWS-210168, "Motivation for new study item on ultra-low power wake up signal in Rel-18," vivo, Spr eadtrum communications, Guangdong Genius, RAN Rel-18 Workshop
[9] RWS-210085, "On RedCap enhancement in Rel-18-supporting batteryless devices," Everactive, R AN Rel-18 Workshop

The invention claimed is:

1. A user equipment forming a wireless communications device operating with a wireless communications network, the user equipment comprising transceiver circuitry configured to transmit signals via a wireless access interface of the wireless communications network and configured to receive signals transmitted via the wireless access interface, control circuitry configured to control the transceiver circuitry to transmit the signals to or receive the signals from the wireless communications network, and an energy storage device configured to provide energy to at least the transceiver circuitry for transmitting the signals to or receiving the signals from the wireless communications network, wherein the control circuitry is configured to determine, during an idle or inactive mode in which the user equipment has no active connection for transmitting data to or receiving data from the wireless communications network, that an amount of energy which is available from the energy storage device will be insufficient for operating the transceiver circuitry during a blackout period, during which the transceiver circuitry cannot receive one or more signals transmitted from the wireless communications network or transmit signals to the wireless communications network, to transmit to the wireless communications network a blackout message indicating that the user equipment cannot receive one or more signals transmitted from the wireless communications network for the blackout period, to monitor, during the blackout period, the amount of energy available from the energy storage device, to determine that there is sufficient energy which can be provided from the energy storage device to operate the transceiver circuitry, and to transmit a blackout complete message to the wireless communications network indicating that the user equipment can receive signals.

2. The user equipment according to claim 1, wherein the blackout message includes an indication of a start time of the blackout period representing a time after which the user equipment will not be able to receive signals from the wireless communications network or transmit signals to the wireless communications network.

3. The user equipment according to claim 2, wherein the start time in the blackout message is indicated as an offset in a number of time slots of the wireless access interface from a time slot in which the blackout message was transmitted or an absolute radio frame of the wireless access interface.

4. The user equipment according to claim 2, wherein the start time of the blackout period when the transceiver circuitry will not be able to receive signals from the wireless communications network or to transmit signals to the wireless communications network is pre-configured.

5. The user equipment according to claim 1, wherein the blackout message includes an indication of a duration of the blackout period when the transceiver circuitry will not be able to receive signals from the wireless communications network or transmit signals to the wireless communications network.

6. The user equipment according to claim 1, wherein the blackout message and the blackout complete message include an identifier of the user equipment.

7. The user equipment according to claim 6, wherein the blackout message includes an identifier of the user equipment and a token generated by the user equipment and the blackout complete message includes the token.

8. The user equipment according to claim 1, wherein the control circuitry is configured to control the transceiver circuitry to transmit the blackout message to a first of a plurality of infrastructure equipment of the wireless communications network, to perform an idle mode reselection of a cell of the wireless communications network and to control the transceiver circuitry to transmit the blackout complete message to a second of the plurality of infrastructure equipment selected by the control circuitry in accordance with the idle mode reselection.

9. The user equipment according to claim 1, wherein the control circuitry is configured to control the transceiver circuitry to transmit the blackout message to a first of a plurality of infrastructure equipment, to perform an idle mode reselection procedure of a first cell of the wireless communications network, and if the control circuitry has selected a second cell formed by a second of the plurality of infrastructure equipment, to control the transceiver circuitry to transmit a blackout complete message to the second infrastructure equipment forming the second cell, or if the control circuitry has selected the first cell formed by the first infrastructure equipment during the idle mode reselection procedure to which the blackout message was transmitted, not to transmit the blackout complete message.

10. The user equipment according to claim 8, wherein the blackout complete message contains cell selection information indicating the infrastructure equipment to which the blackout message was sent.

11. The user equipment according to claim 9, wherein the blackout message and the blackout complete message include an identifier of the user equipment.

12. The user equipment according to claim 11, wherein the blackout message includes an identifier of the user equipment and a token generated by the user equipment and the blackout complete message includes the token.

13. The user equipment according to claim 1, wherein the control circuitry is configured to determine that there is insufficient energy for the transceiver circuitry to receive the signals from the wireless communications network, and insufficient energy for the transceiver circuitry to transmit a response to the signals received from the wireless communications network, the blackout message including an indication of a full blackout indicating that the user equipment cannot receive signals and cannot transmit signals.

14. The user equipment according to claim 1, wherein the control circuitry is configured to determine that there is sufficient energy which can be provided from the energy storage device to the transceiver circuitry for the transceiver circuitry to receive the signals from the wireless communications network, and insufficient energy for the transceiver circuitry to transmit a response to the signals received from the wireless communications network, the blackout message including an indication of a partial blackout indicating that the user equipment can receive signals but not respond to the received signals, and to receive, during the blackout period, a paging message from the wireless communications network.

15. The user equipment according to claim 14, wherein the control circuitry is configured to control the transceiver circuitry to transmit a response to the paging message, after the blackout period, indicating a radio resource control, RRC, connection request message.

16. The user equipment according to claim 1, wherein the control circuitry is configured to determine that there is sufficient energy which can be provided from the energy storage device to the transceiver circuitry for the transceiver circuitry to receive a paging message from the wireless communications network, to transmit a response to the paging message and insufficient energy for the transceiver circuitry to receive data from the wireless communications network associated with the paging message, the blackout message including an indication of a partial blackout indicating that the user equipment can receive the paging message, transmit a response to the paging message but not to receive data from the wireless communications network, to receive the paging message from the wireless communications network, and to transmit a paging response message, wherein the blackout message including the indication of the partial blackout is transmitted with the paging response message.

17. The user equipment according to claim 16, wherein the blackout message includes an indication of a length of the blackout period and the control circuitry is configured to control the transceiver circuitry to receive the data associated with the paging message after the end of the blackout period indicated in the blackout message.

18. The user equipment according to claim 1, wherein the control circuitry is configured to determine that there is sufficient energy which can be provided from the energy storage device to the transceiver circuitry for the transceiver circuitry to receive a paging message from the wireless communications network, to transmit a response to the paging message and insufficient energy for the transceiver circuitry to receive data from the wireless communications network associated with the paging message, the blackout message including an indication of a partial blackout indicating that the user equipment can receive the paging message, transmit a response to the paging message but not to receive data from the wireless communications network, to receive the paging message from the wireless communications network, and to transmit the blackout message in response to the paging message, wherein the blackout message transmitted in response to the paging message indicates to the wireless communications network that the user equipment will transmit a response to the paging message after the blackout period, and to transmit, after the blackout period, a paging response message to the wireless communications network.

19. Circuitry for a user equipment operating with a wireless communications network, the circuitry comprising transceiver circuitry configured to transmit signals via a wireless access interface of the wireless communications network and configured to receive signals transmitted via the wireless access interface, control circuitry configured to control the transceiver circuitry to transmit the signals to or receive the signals from the wireless communications network, and an energy storage device configured to provide energy to at least the transceiver circuitry for transmitting the signals to or receiving the signals from the wireless communications network, wherein the control circuitry is configured to determine, during an idle or inactive mode in which the user equipment has no active connection for transmitting data to or receiving data from the wireless communications network, that an amount of energy which is available from the energy storage device will be insufficient for operating the transceiver circuitry during a blackout period, during which the transceiver circuitry cannot receive one or more signals transmitted from the wireless communications network or transmit signals to the wireless communications network, to transmit to the wireless communications network a blackout message indicating that the user equipment cannot receive one or more signals transmitted from the wireless communications network for the blackout period, to monitor, during the blackout period, the amount of energy available from the energy storage device, to determine that there is sufficient energy which can be provided from the energy storage device to operate the transceiver circuitry, and to transmit a blackout complete message to the wireless communications network indicating that the user equipment can receive signals.

* * * * *